US012204315B2

United States Patent
Fukami et al.

(10) Patent No.: US 12,204,315 B2
(45) Date of Patent: Jan. 21, 2025

(54) PLANT MONITORING AND CONTROL APPARATUS AND PLANT MONITORING AND CONTROL METHOD

(71) Applicant: Mitsubishi Electric Corporation, Tokyo (JP)

(72) Inventors: Kenta Fukami, Tokyo (JP); Mami Naruse, Tokyo (JP); Mitsunobu Yoshinaga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 666 days.

(21) Appl. No.: 17/424,514

(22) PCT Filed: Mar. 14, 2019

(86) PCT No.: PCT/JP2019/010490
§ 371 (c)(1),
(2) Date: Jul. 21, 2021

(87) PCT Pub. No.: WO2020/183690
PCT Pub. Date: Sep. 17, 2020

(65) Prior Publication Data
US 2022/0128974 A1      Apr. 28, 2022

(51) Int. Cl.
*G05B 19/418*       (2006.01)
*G06Q 10/0633*      (2023.01)

(52) U.S. Cl.
CPC ..... *G05B 19/4183* (2013.01); *G06Q 10/0633* (2013.01); *G05B 2219/31323* (2013.01); *G05B 2219/31449* (2013.01)

(58) Field of Classification Search
None
See application file for complete search history.

(56) References Cited

U.S. PATENT DOCUMENTS

2007/0011101 A1*  1/2007 Kidera ............... G06Q 10/06
                                                     705/71
2015/0212506 A1    7/2015 Hasegawa et al.

FOREIGN PATENT DOCUMENTS

JP      H01123304 A    5/1989
JP      H1139032 A     2/1999
(Continued)

OTHER PUBLICATIONS

International Search Report (PCT/ISA/210) with translation and Written Opinion (PCT/ISA/237) mailed on Jun. 4, 2019, by the Japan Patent Office as the International Searching Authority for International Application No. PCT/JP2019/010490. (9 pages).

*Primary Examiner* — David Earl Ogg
(74) *Attorney, Agent, or Firm* — Buchanan Ingersoll & Rooney PC

(57) ABSTRACT

An apparatus comprising: a procedure progress database in which progress status and identification information of a relevant member are recorded for each of pieces of work; a team status evaluation unit which identifies a member requiring support on work in the monitoring and control within a team; an operation support content determination processing unit which determines, as support content, information on the possibility of substitution by a member having the operation authority for the work that the identified member is scheduled to perform; and a presentation information generation processing unit which selects a plurality of persons including the identified member as presentation targets of the determined support content, and generates presentation information in accordance with each of the selected persons.

13 Claims, 15 Drawing Sheets

(56) References Cited

FOREIGN PATENT DOCUMENTS

| | | | | |
|---|---|---|---|---|
| JP | 2001084025 | A | * | 3/2001 |
| JP | 2010231591 | A | * | 10/2010 |
| JP | 2012103883 | A | | 5/2012 |
| JP | 2013029985 | A | * | 2/2013 |
| JP | 2014002706 | A | * | 1/2014 |
| JP | 2015141513 | A | | 8/2015 |

* cited by examiner

| event ID D340 | procedure ID D341 | sequence D342 | condition D343 | work ID D344 | work content D345 | work completion condition D346 | authorized user ID D347 | required work time D348 | work completion constraint condition D349 |
|---|---|---|---|---|---|---|---|---|---|
| A | I | 1 |  | S001 | device A confirmation | condition S001 | User-A User-B | 00:00:10 |  |
|  |  | 2 | AND | S002 | device A operation | condition S002 | User-A | 00:05:00 | R-S002 |
|  |  | 2 |  | S003 | device B operation | condition S003 | User-A User-B | 00:03:00 | R-S003 |
|  |  | 3 |  | S004 | device B confirmation | condition S004 | User-A | 00:00:30 |  |
| ... | ... | ... | ... | ... | ... | ... | ... | ... | ... |
| B | II | 1 |  | S011 | device C confirmation | condition S011 | User-A User-B | 00:00:20 |  |
|  |  | 2 |  | S012 | device C operation | condition S012 | User-B | 00:02:00 |  |
|  |  | 3 | OR | S013 | device D operation | condition S013 | User-B | 00:02:00 | R-S013 |
|  |  | 3 |  | S014 | device E operation | condition S014 | User-B | 00:01:00 | R-S014 |
| ... | ... | ... | ... | ... | ... | ... | ... | ... | ... |

FIG. 3A

| procedure | sequence | condition | work ID | work status | work user ID | actual work time | limit time | time margin | time margin level | allocation candidate user ID |
| --- | --- | --- | --- | --- | --- | --- | --- | --- | --- | --- |
| D360 | D361 | D362 | D363 | D364 | D365 | D366 | D367 | D368 | D369 | D36a |
| I | 1 |  | S001 | completed | User-A | 00:00:10 | – | – | – | – |
|  | 2 | AND | S002 | under execution | User-A | – | 00:06:10 | 00:01:10 | low | – |
|  | 2 | AND | S003 | not initiated | – | – | 00:06:30 | 00:03:00 | low | – |
|  | 3 |  | S004 | not initiated | – | – | 00:08:30 | 00:08:00 | high | – |
| ... | ... | ... | ... | ... | ... | ... | ... | ... | ... | ... |
| II | 1 |  | S011 | completed | User-B | 00:00:10 | – | – | – | – |
|  | 2 |  | S012 | completed | User-B | 00:03:00 | – | – | – | – |
|  | 3 | OR | S013 | under execution | User-B | – | 00:09:40 | 00:07:40 | high | – |
|  | 3 | OR | S014 | not initiated | – | – | 00:11:10 | 00:10:10 | high | – |
| ... | ... | ... | ... | ... | ... | ... | ... | ... | ... | ... |

FIG. 4A

| III | | | | ... | | | ... |
|---|---|---|---|---|---|---|---|
| 1 | S021 | completed | User-A | 00:00:10 | — | — | — | — |
| 2 | S022 | not initiated | — | — | 00:05:10 | 00:01:10 | low | — |
| 2 | S023 | not initiated | — | — | 00:09:10 | 00:06:10 | high | — |
| 3 | S024 | not initiated | — | — | 00:12:10 | 00:11:10 | high | — |
| ... | ... | ... | ... | ... | ... | ... | ... | ... |

| IV | | | | ... | | | ... |
|---|---|---|---|---|---|---|---|
| 1 | S031 | not initiated | — | — | 00:05:15 | 00:03:55 | low | — |
| 2 | S032 | not initiated | — | — | 00:06:35 | 00:03:35 | low | — |
| ... | ... | ... | ... | ... | ... | ... | ... | ... |

FIG. 4B

| procedure ID (D370) | work user ID (D371) | work ID of current-work (D372) | work status of current-work (D373) | work ID of next-work (D374) | time margin of next-work (D375) | time margin level of next-work (D376) |
|---|---|---|---|---|---|---|
| I | User-A | S002 | under excution | S003 | 00:03:00 | low |
| II | User-B | S013 | under excution | S012 | 00:07:40 | high |
| III | User-A | S022 | under excution | S22 | 00:01:10 | low |
| IV | — | S031 | not initiated | S31 | 00:03:55 | low |

D37 encompasses D371–D376.

FIG. 5

| procedure ID | work user ID | work ID of current-work | work status of current-work | work ID of next-work | performance level |
|---|---|---|---|---|---|
| I | User-A | S002 | under excution | S003 | low-1 |
| II | User-B | S011 | under excution | S012 | high |

FIG. 11

PLANT MONITORING AND CONTROL APPARATUS AND PLANT MONITORING AND CONTROL METHOD

TECHNICAL FIELD

The present application relates to a plant monitoring and control apparatus and a plant monitoring and control method.

BACKGROUND ART

In recent years, a software type digital monitoring and control panel (digital panel) has been introduced in place of a conventional hardware type analog monitoring and control panel in the monitoring and control apparatus for a large-scale plant in an electric power field or the like. In the digital panel, work is performed using a graphical user interface (GUI) in which monitoring and control functions are integrated, making it possible to reduce the size of the apparatus and a load on an operator in the operation.

Further, with regard to the content and presentation of information, a technique is disclosed in which status of a workload and a psychological status are determined from data on the frequency of operation by an operator and the voice frequency, and the amount and form of information to be presented to the operator are optimized (for example, refer to Patent Document 1). Furthermore, a technique is disclosed in which the relationship between the plant status and the operation content in each operator is learned and appropriate information is presented in accordance with the degree of skill of each operator and the plant status (for example, refer to Patent Document 2).

CITATION LIST

Patent Document

Patent Document 1: Japanese Patent Application Laid-open No. H1-123304 (upper left column in page 4 to upper right column in page 5, FIG. 1)
Patent Document 2: Japanese Patent Application Laid-open No. H11-39032 (paragraphs 0008 to 0023, FIGS. 1 to 3)

SUMMARY OF INVENTION

Problems to be Solved by Invention

On one hand, in actual operation management in a large-scale plant, the operation is not executed individually by each operator, but is executed rather as a team with a plurality of members in cooperation. On the other hand, in the techniques described above, a perspective of team work is lacking, and even if the presentation of information to each operator is optimized and the work efficiency of each operator is improved, it does not necessarily lead to the improvement of the performance of the team. In other words, presentation of information is not possible to such an extent that optimal plant monitoring and control is performed as a cooperative work.

The present application discloses a technique to solve the problems described above and an object thereof is to provide a plant monitoring and control apparatus or a plant monitoring and control method capable of performing optimum monitoring and control by the cooperation.

Means for Solving Problems

A plant monitoring and control apparatus for monitoring and controlling a plant in cooperation with a plurality of members comprising: an input/output unit which is provided for each of the plurality of members and accepts input/output operations for the monitoring and control; a monitoring and control procedure database in which work content and identification information are recorded in association therewith, the work content being for each of a plurality of pieces of work for each of monitoring and control procedures determined in advance according to events that can occur in the plant, and the identification information being of members having operation authority of the work concerned among the plurality of members; a procedure progress database in which progress status for each of the plurality of pieces of work for each of the procedure and identification information of a member who is performing or to be in charge of the work concerned are associated with each other and the associated record is updated in response to the input/output operations and occurrence of the events; a status evaluation unit which evaluates status of each of the plurality of members, determines whether or not there is a member requiring support on work in the monitoring and control, and identifies the member, in response to the update of the record of the procedure progress database; a support content determination unit which extracts work scheduled to be performed by the identified member from information recorded in the procedure progress database when the member requiring the support is identified, determines a possibility of substitution by a member having the operation authority for the extracted work from information recorded in the monitoring and control procedure database, and determines information relating to the substitution of the extracted work as support content; and a presentation information generation unit which selects a plurality of persons including the identified member as presentation targets of the support content from the plurality of members and generates presentation information in accordance with each of the selected persons on the basis of the support content that is determined.

A plant monitoring and control method for monitoring and controlling a plant in cooperation with a plurality of members comprising: a step of associating work content with identification information and recording them in monitoring and control procedure database, the work content being for each of a plurality of pieces of work for each of monitoring and control procedures determined in advance according to events that can occur in the plant, and the identification information being of members having operation authority of the work concerned among the plurality of members; a step of associating progress status for each of the plurality of pieces of work for each of the procedures with identification information of a member who is performing or to be in charge of the work concerned and updating a record in a procedure progress database in response to input/output operations for the monitoring and control and occurrence of the events; a status evaluation step of evaluating status of each of the plurality of members and determining whether or not there is a member requiring support on work in the monitoring and control, and identifying the member, in response to the update of the record of the procedure progress database; a support content determination step of extracting work scheduled to be performed by the identified member from information recorded in the procedure progress database when the member requiring the support is identified, determining a possibility of substitution by a member having the operation authority for the extracted work from information recorded in the monitoring and control procedure database, and determining information relating to the substitution of the extracted work as support content; and a presentation information display step of selecting a plurality of persons including the identified member as presentation targets of the support content from the plurality of members and generating and displaying presentation information in accordance with each of the selected persons on the basis of the support content that is determined.

Effect of Invention

According to the plant monitoring and control apparatus or the plant monitoring and control method disclosed in the present application, an examined result of the possibility of work substitution from among persons having the operation authority are presented as the support content to the plurality of members including the person requiring support, so that optimum monitoring and control can be performed by the cooperation.

BRIEF DESCRIPTION OF DRAWINGS

FIG. 3A is a diagram illustrating the first half of an example of data registered for each item into a monitoring and control procedure database in the plant monitoring and control apparatus according to Embodiment 1.

FIG. 4A is a diagram illustrating the first half of an example of data stored for each item in a procedure progress database in the plant monitoring and control apparatus according to Embodiment 1.

FIG. 4B is a diagram illustrating the second half of an example of the data stored for each item in the procedure progress database in the plant monitoring and control apparatus according to Embodiment 1.

FIG. 5 is a diagram illustrating an example of intra-team work status data generated by a team status evaluation processing unit of the plant monitoring and control apparatus according to Embodiment 1.

FIG. 11 is a diagram illustrating an example of intra-team performance status data generated by a team status evaluation processing unit of the plant monitoring and control apparatus according to Embodiment 2.

MODES FOR CARRYING OUT INVENTION

Embodiment 1

Figure 1:
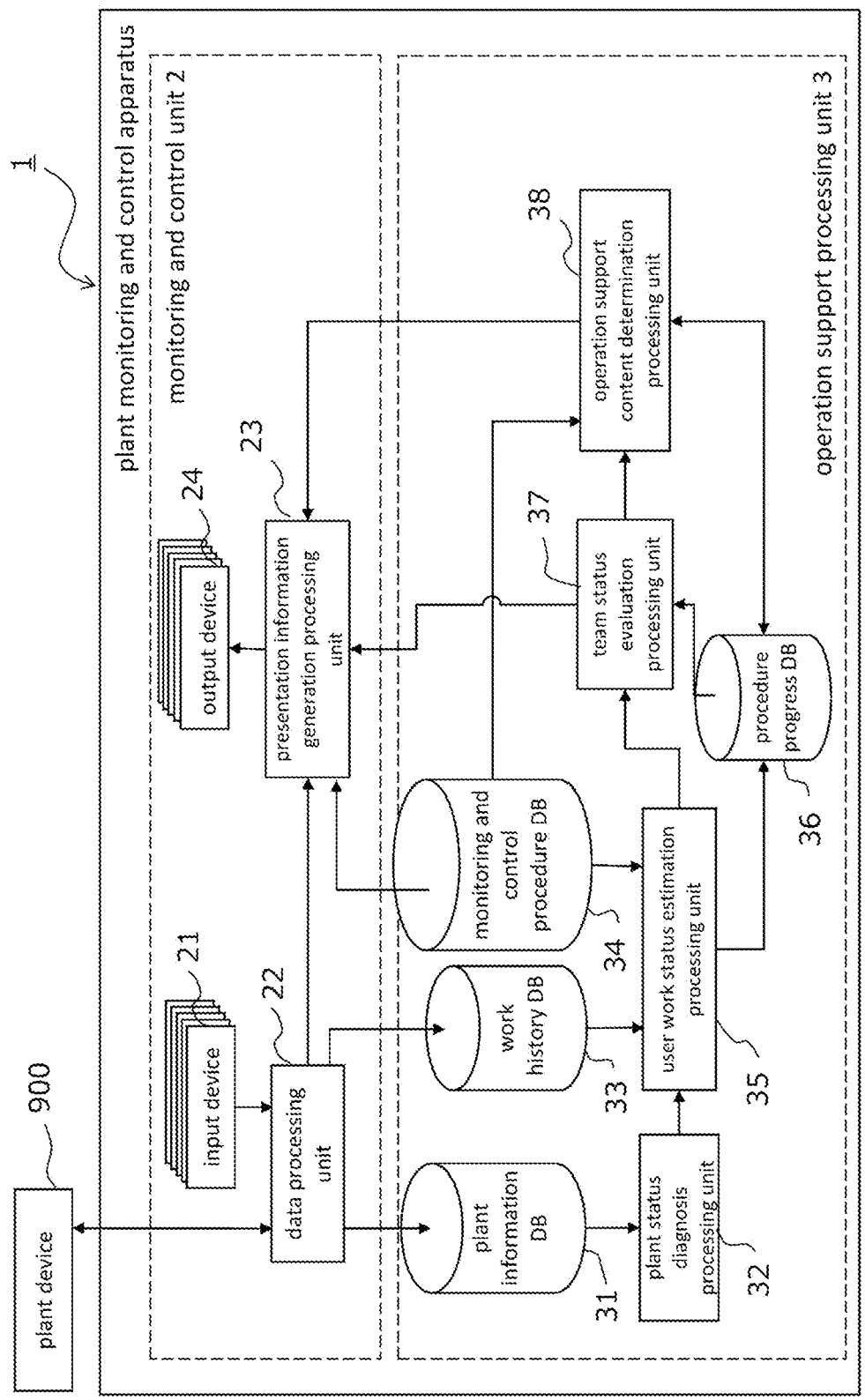
FIG. 1 is a block diagram for describing a configuration of a plant monitoring and control apparatus according to Embodiment 1.
Figure 2:
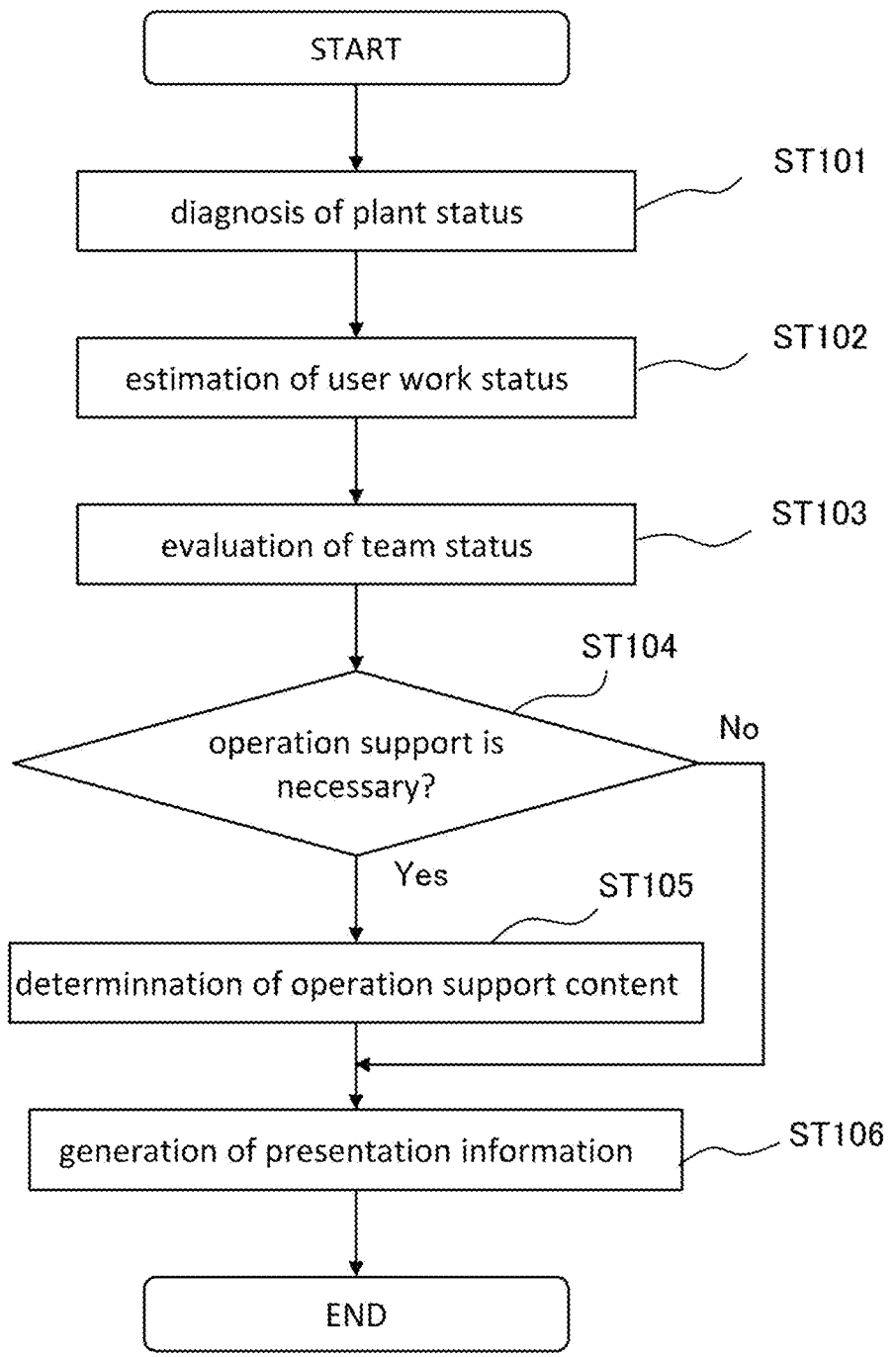
FIG. 2 is a flowchart for describing operation of a plant monitoring and control method according to Embodiment 1.

FIG. 1 to FIG. 9 are diagrams for describing a plant monitoring and control apparatus or a plant monitoring and control method according to Embodiment 1, FIG. 1 is a block diagram for describing a configuration of a part mainly relating to presentation of information in the plant monitoring and control apparatus, and FIG. 2 is a flowchart for describing operation of the plant monitoring and control apparatus, that is, the plant monitoring and control method. FIG. 3A and FIG. 3B are diagrams illustrating examples of data registered for each item relating to an operation procedure into a monitoring and control procedure database in the plant monitoring and control apparatus, which are divided into the first half portion and the second half portion, respectively. FIG. 4A and FIG. 4B are diagrams illustrating examples of data stored for each item relating to progress status in a procedure progress database in the plant monitoring and control apparatus, which are divided into the first half portion and the second half portion, respectively. FIG. 5 is a diagram illustrating examples of data for each item of intra-team work status data generated by a team status evaluation processing unit.

Figure 6:
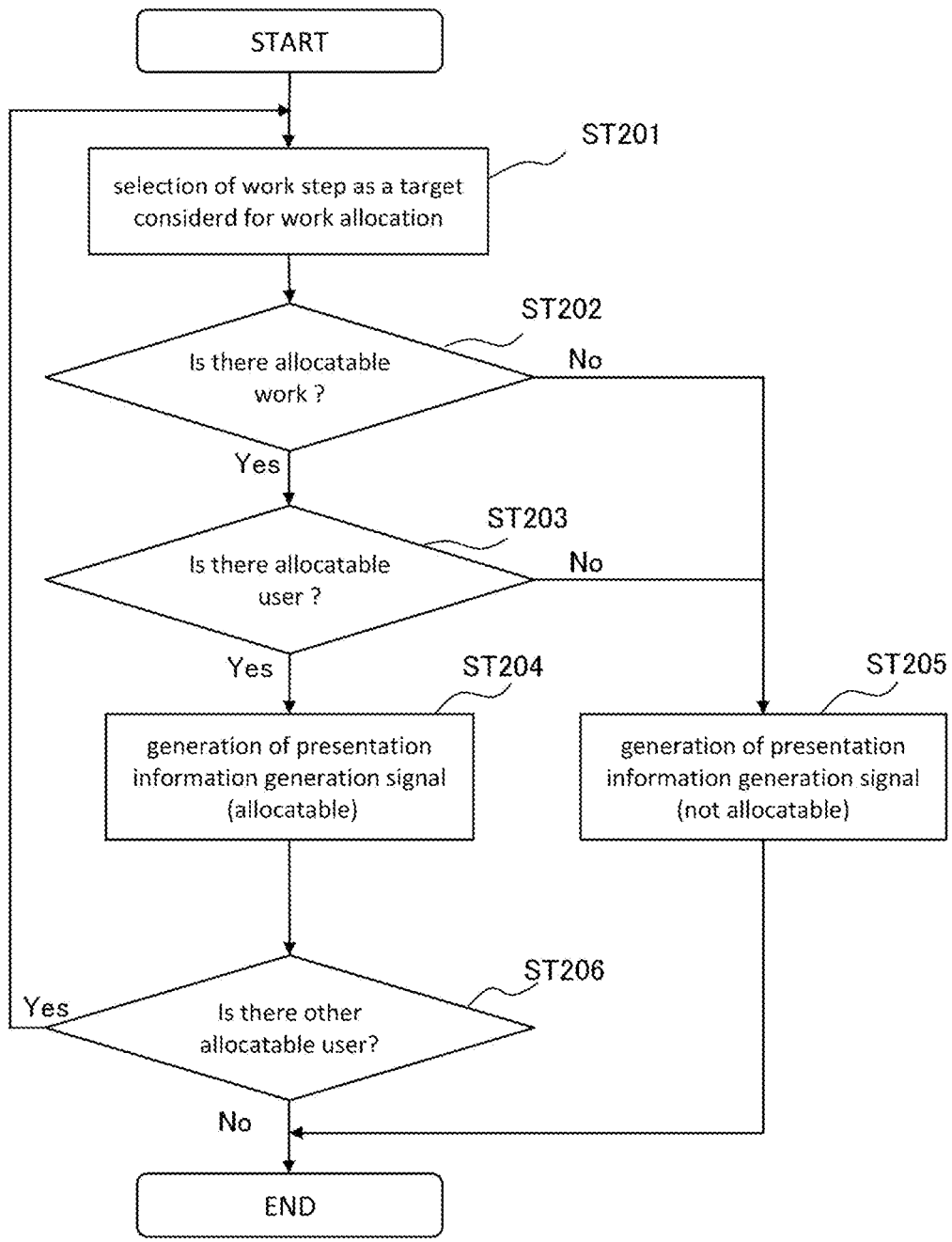
FIG. 6 is a flowchart for describing operation in steps of determining operation support content in the plant monitoring and control method according to Embodiment 1.
Figure 7A:
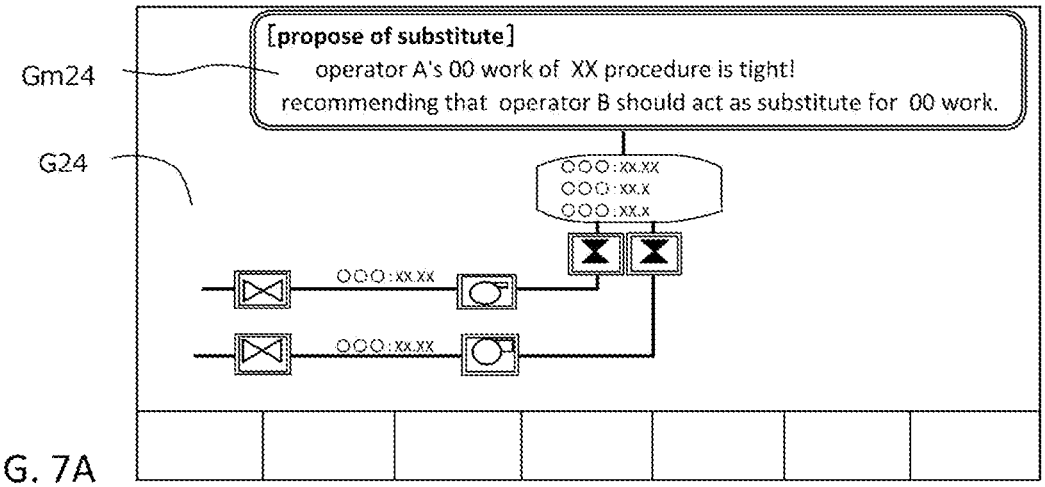
FIG. 7A to FIG. 7C are diagrams each illustrating an example of display for an operator who is in a different position in work when operation support information related to work allocation is displayed on a screen in the plant monitoring and control apparatus according to Embodiment 1.
Figure 7B:
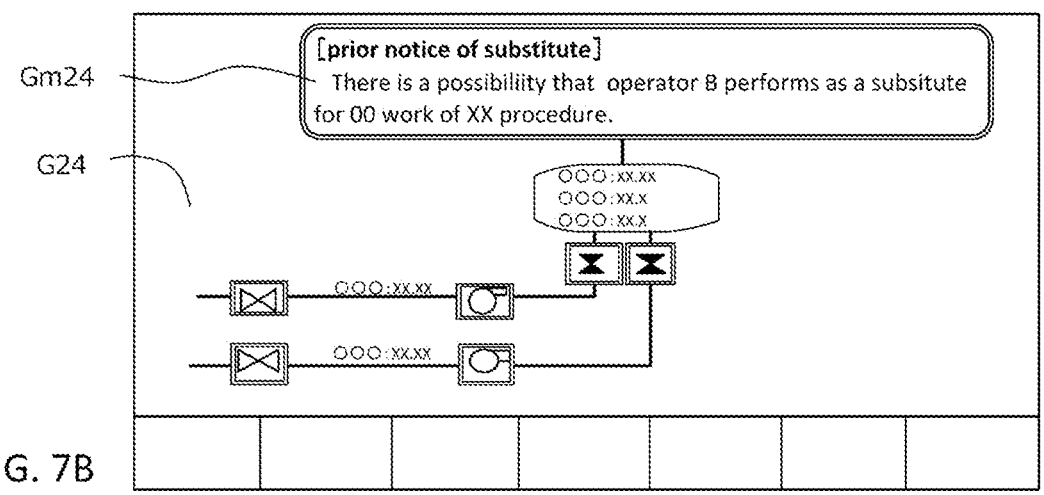
Figure 7C:
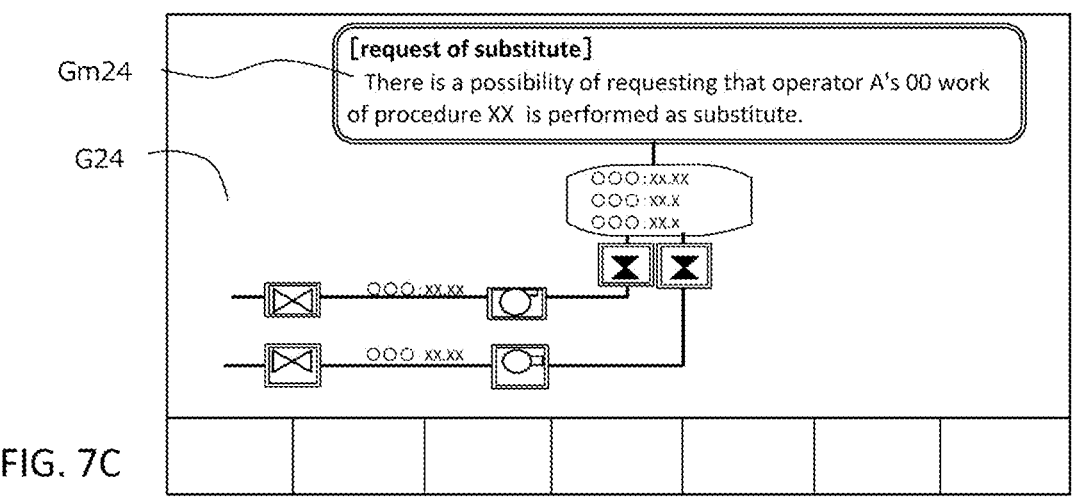
Figure 8A:
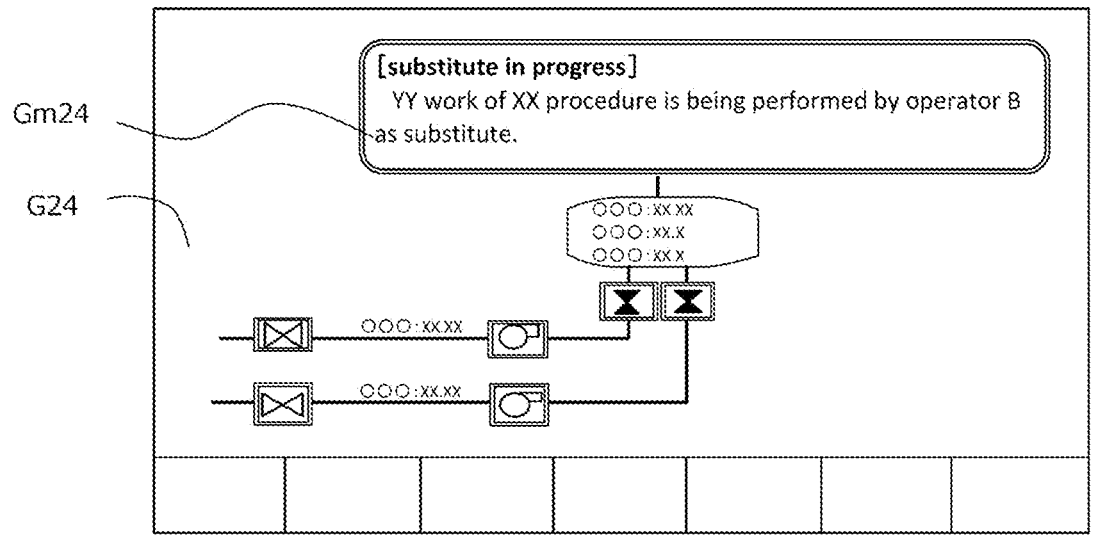
FIG. 8A and FIG. 8B are diagrams illustrating different display examples when the operation support information is displayed on a screen at a time when certain work is performed by a substitute in the plant monitoring and control apparatus according to Embodiment 1.
Figure 8B:
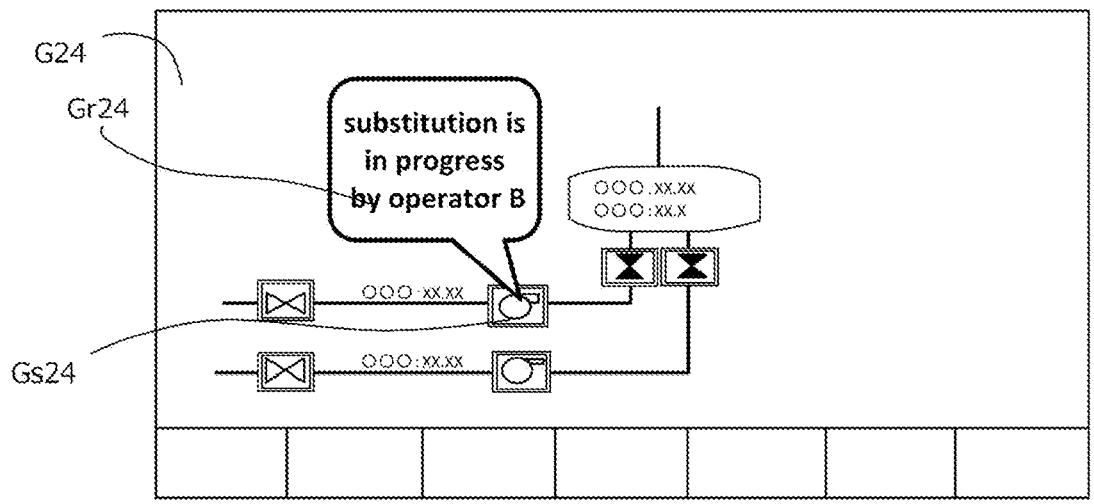
Figure 9:
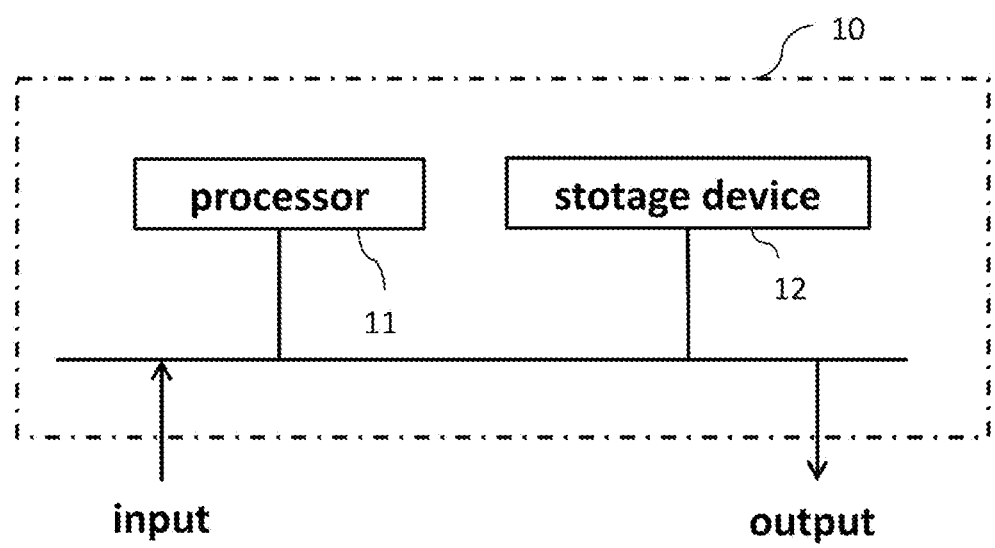
FIG. 9 is a block diagram illustrating an example of a configuration of a part that executes arithmetic processing of the plant monitoring and control apparatus according to Embodiment 1.

Further, FIG. 6 is a flowchart for describing operation in steps of determining operation support content in the plant monitoring and control method, and FIG. 7A to FIG. 7C are diagrams illustrating examples of display provided respectively for a supervisor, an operator who will receive a support, and an operator who will be requested to provide the support as persons having different positions in work, when operation support information related to work allocation is displayed on a screen. FIG. 8A and FIG. 8B are diagrams each illustrating a different display example at the time when the operation support information is displayed on a screen when certain work is performed by a substitute. Furthermore, FIG. 9 is a block diagram illustrating an example of a configuration in a case in which a part for executing arithmetic processing in the monitoring and control unit and the operation support processing unit in the plant monitoring and control apparatus is performed by using a certain hardware.

Prior to detailed description of the plant monitoring and control apparatus and the plant monitoring and control method according to each of embodiments of the present application, an actual state of plant monitoring and control as a premise will be described. Typically, plant monitoring and control is performed by an operation team consisting of a plurality of members who monitor and operate a central control panel of a monitoring and control room. The team consists of a plurality of operators who perform monitoring and operations, and a supervisor who gives work instructions to the operators and monitors their actions. Dedicated an input and output device for the monitoring and control (input/output device) is prepared for each of the operators and the supervisor, and thus the plant monitoring and control is performed using the input/output device provided to each of them.

As a typical monitoring and control procedure of a plant, the supervisor first instructs an operator on work content. The operator performs the work using the input/output device that is provided. After performing the work, the operator reports the completion to the supervisor and the supervisor confirms the work content performed by the operator using his own input/output device. Note that, as a form of the plant monitoring and control, in addition to a case where all the members of the operation team are present in the monitoring and control room and operate the plant while communicating orally, a case where the operators in the monitoring and control room and the supervisor in a remote location communicate remotely is also assumed.

Work given as instructions may be repeated in a certain pattern, but it will vary in accordance with the status of the plant. In addition, work given as instructions to each operator is not limited to work that an operator will be instructed to perform next, but may be related to work that another operator is currently performing or will be instructed to perform next. Furthermore, work given as instructions at one time, or its related work, may not necessarily be given as instructions to the same operator the next time.

Under such circumstances, decrease in the work efficiency and human errors such as operation errors and situation awareness errors may occur in a situation where the workload is high for the operators, such as when task must be performed within a limited time. In the above situation, as explained in the background art, information for optimal monitoring and control through cooperation is not provided only by the presentation of information that lacks the perspective of team work being the basis of the monitoring and control, such as the presentation of information in the conventional way according to the plant status or the status of individual operators. This is true even when the team members can work within sight of each other, but it becomes even more pronounced when some team members, such as the supervisor, etc., are in a remote area, because the amount of information to understand the team status is limited through interposition of a communication system.

Therefore, for the purpose of improving the work efficiency (performance) of an entire team, information for appropriate work interchange among the operators needs to be presented on the basis of the plant status, the status of the plurality of operators constituting the team, and relevance to the work associated with the operators. On the premise of the above, the plant monitoring and control apparatus and the plant monitoring and control method according to Embodiment 1 will be described.

As shown in FIG. 1, the plant monitoring and control apparatus 1 includes a monitoring and control unit 2 for controlling a plurality of plant devices 900 within a plant and providing plant information to users, and an operation support processing unit 3 for generating information relating to operation support and outputting the information to the monitoring and control unit 2. Note that, in the following description, when a single plant device is indicated, it will be described simply as the plant device 900, including a case where the plurality of plant devices are indicated.

Monitoring and Control Unit

The monitoring and control unit 2 includes an input device 21 and an output device 24 for inputting and outputting data, a data processing unit 22 for processing the data received from the input device 21 and the plant, and a presentation information generation processing unit 23 for generating information to be presented on the output device 24, such as the plant status and support content. As will be described below, it is configured such that the plant device 900 is controlled on the basis of operations input by an operator using the input device 21 or by operations of automatic control, and the plant information that is information on the plant device 900 is provided for the user via the output device 24.

The input device 21 and the output device 24 are monitoring and control interfaces used by the plurality of operators and the supervisor (hereinafter referred to as "users") who constitute the operation team, and one or more of them are assigned to each user. The input device 21 is a device for performing a display control input for the output device 24 by the users, an operation input for the plant device 900 by the users, and confirmation input with respect to a value of the plant device 900 by the users. A confirmation input signal inputted through the confirmation input or an operation input signal inputted through the operation input (hereinafter referred to as confirmation/operation input signals) is transmitted to the data processing unit 22.

The confirmation/operation input signals include data of time at which the signal concerned is generated, data for distinguishing a user who operates the input device 21 (user ID), and data for uniquely distinguishing the content of the confirmation/operation (work ID). The user ID distinguishes a member in the team (the supervisor and all the operators), and each user uses the input device 21 to which his or her user ID is assigned and the output device 24 described later.

An example of the input device 21 is a touch panel in which a mouse and the output device 24 are integrated. The display control input, the operation input, and the confirmation input are performed, for example, through mouse clicks or touch operations. In addition, an eye-tracking sensor or other device may be used as the input device 21 for the confirmation input. The output device 24 is a display terminal, such as a monitor, which displays a monitoring screen image showing operation status of the plant device or the operation support information to be described later.

The data processing unit 22 receives plant information from the plant device 900 and the confirmation/operation input signals from the input device 21, and generates various signals to be transmitted to the plant device 900, the presentation information generation processing unit 23, and the operation support processing unit 3. Specifically, it receives measurement signals and transmits control signals to the plant device 900. To the presentation information generation processing unit 23, it generates and transmits presentation information generation signals for generating and updating the monitoring screen image on the basis of the plant information or input signals from the plant device 900. It also generates information for the operation support processing unit 3 and performs writing processes to databases.

The presentation information generation processing unit 23 generates screen drawing data associated with a user to be output to the output device 24. The screen drawing data is generated in accordance with the presentation information generation signals for generating and updating the monitoring screen image output from the data processing unit 22 or the presentation information generation signals of the operation support information acquired from the operation support processing unit 3 described later. In order to simplify the description in the present application, the monitoring drawing data is exemplified by a display for the visual sense as in the screen display example described later, but the monitoring drawing data is not limited to this, and may include voice data for the auditory sense, data for the tactile sense, and the like.

Operation Support Processing Unit

The operation support processing unit 3 evaluates the plant operation status of each user and the status as the team on the basis of the plant information and the confirmation/operation input signals of users that are transmitted from the monitoring and control unit 2. Further, in order to play a role of determining the operation support content in accordance with the status and transmitting the presentation information generation signals relating to the operation support information to the presentation information generation processing unit 23 of the monitoring and control unit 2, a plurality of databases including data of the relevance to work associated with the users are provided. A plurality of processing units are provided for generating information necessary for the operation support including information for smoothly interchanging work within the team on the basis of the data.

The databases (denoted by DB in the figures) include a plant information database 31, a work history database 33, a monitoring and control procedure database 34, and a procedure progress database 36. The processing units include a plant status diagnosis processing unit 32, a user work status estimation processing unit 35, a team status evaluation processing unit 37, and an operation support content determination processing unit 38.

The plant information database 31 accumulates the plant information on the plant device 900 via the data processing unit 22. The plant status diagnosis processing unit 32 estimates events that occur in the plant on the basis of time-series plant information accumulated in the plant information database 31. The work history database 33 stores time-series confirmation/operation history data (work history data) generated on the basis of the confirmation/operation input signals by the input device 21 via the data processing unit 22.

As described above, an entire description on actual plant operation management in which the users and a plurality of pieces of work are related to each other within the time series will be complicated and difficult to be organized. Therefore, in Embodiment 1, among the users (operators and supervisor), the work of two operators necessary for clarifying the technical idea of the present application is focused, and an example in which information is presented to three users including the supervisor will be described. Therefore, the data handled by each database or processing units will be described on the basis of the work performed by two persons, namely, User-A and User-B, and the confirmation/operation history data by the two persons.

In the monitoring and control procedure database 34, the monitoring and control procedure for each of the events and information prescribed for an execution of the confirmation/operation constituting the monitoring and control procedure are registered. The user work status estimation processing unit 35 estimates work progress status (procedure progress status) of the users on the basis of the output of the plant status diagnosis processing unit 32, the work history data (result of user's action (confirmation/operation)) of the work history database 33, and the monitoring and control procedure database 34.

The procedure progress database 36 stores information on the procedure progress status generated by the user work status estimation processing unit 35. The team status evaluation processing unit 37 evaluates the team status on whether or not a user having a problem in performing work is in the team on the basis of information on the procedure progress status of each user stored in the procedure progress database 36.

On the basis of the evaluation result of the team status evaluation processing unit 37, the operation support content determination processing unit 38 determines the operation support content such as a proposal for the work allocation within the team or calling for the attention of the supervisor regarding performance decrease of an operator when there is an operator who has a problem in performing work. Then, it is configured such that, in order to present the determined operation support content, the presentation information generation signals are generated and transmitted to the presentation information generation processing unit 23 of the monitoring and control unit 2.

The operation will be described on the basis of the configuration described above. The plant information of the plant device 900 is stored in the plant information database 31 in time series together with the time data via the data processing unit 22. Examples of the plant information include plant values which are values indicating the status of various plant devices, alarm information such as an abnormal signal, and the like. The confirmation/operation input signal of each user inputted from the input device 21 is interpreted by the data processing unit 22 and is stored in the work history database 33 as work history data.

Examples of the work history data include time data, user ID data, work ID data, work-related information (for example, confirmation/operation target ID data, plant value of confirmation/operation result). Operations include one that is completed in a single operation and the other in which a certain operation is continually performed (for example, a continual button pressing operation to manually adjust a valve opening). In the latter case, a plurality of operation input signals are generated and successively stored in the work history database 33. The operation so far is the same as in a general plant monitoring and control apparatus.

Next, the operation of the operation support processing unit 3 which contains a characterizing portion of the present application, and the operation until the operation support information output to the output device 24 on the basis of the processing result will be described referring to the flowchart of FIG. 2.

In step ST101, the plant status is diagnosed. The plant status diagnosis processing unit 32 internally has a knowledge base for storing data necessary for event diagnosis such as the relation between cause of a failure and event propagation, acquires the alarm information and the plant value from the plant information database 31, and executes event diagnosis using the knowledge base. As a result of the diagnosis, one or more occurring events are identified, and event ID data for distinguishing the events is transmitted to the user work status estimation processing unit 35. Step ST101 is periodically executed at a predetermined cycle, and event ID data is transmitted every time a new event occurs. The method of event diagnosis is an example and is not limited to the above.

In step ST102, a process of estimating user work status is performed. The flow of the entire operation executed by the user work status estimation processing unit 35 will be shown. First, after new event ID data from the plant status diagnosis processing unit 32 is received, a procedure associated with the event ID is identified by referring to the data stored in the monitoring and control procedure database 34 (data structure will be described later). The procedure is composed of one or more work steps (confirmation work or operation), and new procedure progress data based on the procedure structure is generated in the procedure progress database 36 (data structure will be described later).

Then, among the work history data stored in the work history database 33, unconfirmed work history data is referred to one by one in the ascending order of time. Then, the progress status of the work steps of the procedure concerned is estimated, and the estimation result is stored in the procedure progress data portion of the work steps concerned in the procedure progress database 36. Here, the progress status to be estimated indicates the quality of the progress of the work steps. In Embodiment 1, the remaining time (time margin level) with respect to the time limit for completing each work step is used as an index, and on the basis of the result of the estimation, a work step having a low time margin is treated as having a problem in the work progress in the following step ST103.

Figure 3B:
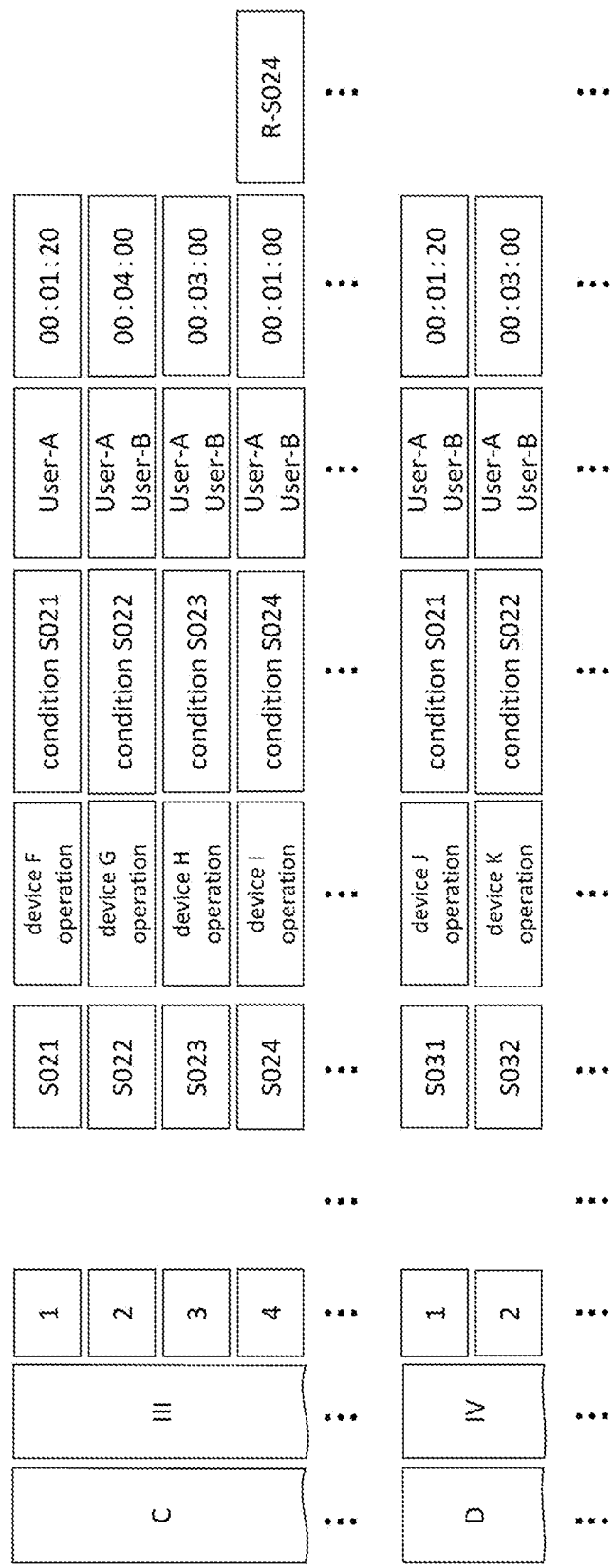
FIG. 3B is a diagram illustrating the second half of an example of the data registered for each item into the monitoring and control procedure database in the plant monitoring and control apparatus according to Embodiment 1.

In the monitoring and control procedure database 34, as shown in FIG. 3A and FIG. 3B, IDs, conditions, and the like are systematically registered in a plurality of data items. The data items include, in order from the left, event ID data D340, procedure ID data D341, sequence data D342 for the execution of each work step, condition data D343 (AND/OR condition) relating to the execution of the work steps, and work ID data D344 for distinguishing the work steps. Further, there are work content data D345, work completion condition data D346, authorized user ID data D347 of which the user can execute the work step concerned, and required work time data D348 which is a time normally required for the execution of a work step, and then they are followed by work completion constraint condition data D349 which is a constraint condition required for completion of a work step. And from the event ID data D340 and the procedure ID data D341 in this order, they all are systematically arranged to be registered.

In the procedure progress database 36, as shown in FIG. 4A and FIG. 4B, IDs, a condition, and the like are systematically registered in a plurality of data items as in the monitoring and control procedure database 34. As the data items, in order from the left, procedure ID data D360, sequence data D361, condition data D362, and work ID data D363 are stored, and in addition, there is work status data D364 (not initiated/under execution/completed) of a work step. Furthermore, there are work user ID data D365 of which a work step has been executed or is being executed, actual work time data D366, limit time data D367 indicating a limit time until the completion of a work step, and time margin data D368 until the limit time reaches, and then they are followed by time margin level data D369 (for example, low/high) calculated from the margin time, allocation candidate user ID data D36*a* (details will be described later). And from the procedure ID data D360 and the sequence data D361 in this order, they all are systematically arranged to be stored.

Using the examples of data in each database shown in FIG. 3A, FIG. 3B, FIG. 4A, and FIG. 4B, the operation of the user work status estimation processing unit 35 (step ST102) will be described in detail. The process of the user work status estimation processing unit 35 consists of three types of processes: an event determination process, a procedure completion confirmation process, and a time monitoring process for incomplete work (work not initiated/work under execution).

In the event determination process, after the event ID data is received from the plant status diagnosis processing unit 32, one or more procedures for the event are identified by referring to the monitoring and control procedure database 34. Thereafter, new procedure progress data is created in the procedure progress database 36 by referring to the monitoring and control procedure database 34. The data to be stored in the work status data D364 is entered as "not initiated" for a new procedure. The work user ID data D365 is stored after the user initiates the work (confirmation/operation), and the actual work time data D366 is stored after the work is completed.

After the event determination process is performed, the procedure completion confirmation process is performed at regular intervals until the work steps of all procedures are completed. The user work status estimation processing unit 35 refers to the work history database 33 at regular intervals to confirm whether there is any unconfirmed work history data, and if there is the data, the work ID data in the work history data is compared with the monitoring and control procedure database 34 to identify procedures and work steps that are concerned. Thereafter, whether or not the work steps have been completed by the work concerned is determined by referring to the work completion condition data D346.

For example, if the condition is "operation is executed until the valve opening becomes 100%", whether or not the condition is satisfied (whether or not operation is completed) is determined from the plant value, etc. acquired as a result of the operation. The determination result is stored in the work status data D364 of the procedure progress database 36. If a completion condition is not satisfied, it is updated to "under execution", and the user ID in the work history data is stored in the work user ID data D365. When the completion condition is satisfied, "completed" is stored, the user ID is stored in the work user ID data D365, and the time taken for the work execution is calculated from the time data of the work history database 33 and is stored in the actual work time data D366. In the limit time data D367, time margin level data D369, and the margin time data D368, for example, data "-" indicating completion is stored.

Thereafter, the difference between the required work time data D348 in the monitoring and control procedure database 34 and the actual work time data D366 in the procedure progress database 36 is calculated. The calculated difference is added to the margin time data D368, which is to be described later, to update the margin time data D368 and the time margin level data D369. For example, when the actual work time data D366 is smaller than the required work time data D348 which indicates a standard work time, the margin time increases. Here, when there is data in the allocation candidate user ID data D36*a* in the procedure progress database 36, a process relating to work allocation, which will be described later, is performed. Each time the processes are performed up to the above, an update signal is transmitted to the team status evaluation processing unit 37.

In the time monitoring process for the incomplete work, a process of calculating the margin time data D368 and the time margin level data D369 is performed for each work step in which the work status data D364 corresponds to "under execution" or "not initiated". First, the limit time data D367 which is a limit time required to complete the work step concerned is calculated using the work completion constraint condition data D349 registered in the monitoring and control procedure database 34. The work completion constraint condition data D349 reflects a condition required for the completion of the work step of which the data thereof is set (for example, executed and completed within 10 minutes after another work step is completed, etc.)

When there is a work step to which the work completion constraint condition data D349 is not set, the limit time data D367 of a subsequent work step in which the work completion constraint condition data D349 is set is referred to. The required work time data D348 of the previous work step is subtracted from the limit time data D367 that is referred to, and calculation is successively made backward to calculate the limit time data D367 of each work step, and then they are stored. Note that the work completion constraint condition data D349 is set in the last work step of each procedure. Thereafter, the margin time data D368 of each work step being under execution or not initiated is calculated by subtracting the required work time data D348 from the limit time data D367 and stored.

The time margin level data D369 is calculated from the margin time data D368 in accordance with a predetermined threshold value. In Embodiment 1, the time margin level is set in the two-stage evaluation of "low" or "high", but the setting of the number of stages is not limited to this. As described above, the margin time data D368 and the time margin level data D369 are updated in accordance with the result of the procedure completion confirmation process. Further, the limit time data D367, the margin time data D368, and the time margin level data D369 are updated by the user work status estimation processing unit 35 in a predetermined cycle with the lapse of time.

In step ST103, the team status evaluation processing unit 37 receives the update signal from the user work status estimation processing unit 35 and performs a process to evaluate the team status. Thereafter, the procedure progress database 36 is referred to, and intra-team work status data D37 as shown in FIG. 5 is generated. In the intra-team work status data D37, work user ID data D371, work ID data D372, and work status data D373 that relate to the current work are generated with respect to procedure ID data 370. Further, work ID data D374, margin time data D375, and time margin level data D376 (for example, low/high) that relate to the next work to be performed after the current work are generated. The next work corresponds to the subsequent work if there is work whose work status data D364 in the procedure progress database 36 is "under execution", and corresponds to the first work in the procedure if all the work in the procedure is "not initiated", the next work being determined according to the condition data D362.

On the basis of the team status evaluated in step ST103, in step ST104, it is determined whether or not operation support is required. If there is any work of which the time margin level data D376 for the next work is "low," it is determined that there is an operator who needs operation support (person requiring support), and the intra-team work status data D37 described in FIG. 5 is transmitted to the operation support content determination processing unit 38 in order to proceed to step ST105. If all of the time margin level data D376 for the next work is "high," the presentation information generation signal indicating that there is no problem in the work progress is generated and transmitted to the presentation information generation processing unit 23, and the process proceeds to step ST106.

If it is determined in step ST104 that there is a user with a problem; namely, operation support is necessary (Yes), the operation support content determination processing unit 38 determines in step ST105 what kind of operation support will be provided, such as a proposal for the work allocation within the team. The detailed operation in step ST105 executed by the operation support content determination processing unit 38 will be described on the basis of the flowchart shown in FIG. 6.

First, from the intra-team work status data D37 received from the team status evaluation processing unit 37, work steps of which the time margin level data D376 for the next work is "low" are extracted. Then, among the work steps of which the time margin data D376 is "low," a work step of which the value of the margin time data D375 for the next work is the smallest (margin time is little) is selected as a target considered for work allocation (step ST201).

As described in detail later, the operation support content determination processing unit 38 may perform the process from this step ST201 again after the work allocation is made. If a user for the allocation is already assigned to the selected work step, another work step is selected. Whether or not the data is stored in the allocation candidate user ID data D36a of the selected work step is confirmed by referring to the procedure progress database 36, and if it is stored, a work step with the next smaller value of the margin time data D375 is selected.

If the work status data D373 of the selected work step is "under execution," it is determined that the user listed in the work user ID data who is executing the procedure concerned may be under a high workload, and the user is identified as a person requiring support. Then the next work to be performed by the person requiring support (the next work of which the value of the margin time data D375 is the smallest, or the work that is not initiated in other procedures) is confirmed, and it is determined whether or not there is any work that can be allocated (step ST202).

First, it is determined whether or not the next work of which the value of the margin time data D375 is the smallest can be allocated. The condition data D362 for the work ID data D363 where the work ID data D372 concerned and the procedure ID data D360 are in common (in the same procedure) is referred to. If there is an "AND" work (work that can be performed in parallel) in the condition data D362, then among the other work steps to which the same "AND" condition is assigned, the work ID data D363 (e.g., work ID data D363: "S003") of the work step whose work status data D364 is "not initiated" is acquired. If there is no such work step, the next work step cannot be initiated unless the work currently being performed in that procedure is completed, and thus whether or not there is a work step in another procedure that can be allocated is confirmed.

Specifically, the work user ID data D365 of the user who executes the work step of interest is confirmed. Then, among the other procedures (different in procedure ID data D360) in the procedure progress database 36, a work step next to the work step that is "under execution", or a work step that is completed up to an intermediate work step but the remaining is "not executed" is acquired. For example, the work step whose work ID data is "S022" in FIG. 4B is acquired, and it is determined that there is the work step that can be allocated ("Yes" in step ST202).

If any work steps that do not match the condition described above ("No" in step ST202), there is no work that can be allocated, and for example, a later-described process for presentation of information such as a notification to the supervisor in which the status is presented to encourage the supervisor to take measures is performed (Step ST205). Note that, if the work status data D373 of the work step of which the value of the margin time data D375 is the smallest is "not initiated," it is determined that there is the work step that can be allocated ("Yes" in step ST202), and the process proceeds to step ST203 described next.

In step ST203, it is confirmed whether or not there is a user who has execution authority for the work step of the next work acquired as the work step that can be allocated (step ST203). When the work status data D373 of the work step selected in step ST201 is "under execution", it is determined that the user of the user ID data D371 of the work step is under a high workload. Therefore, it is confirmed whether or not user IDs other than the person requiring support are registered as allocation candidates in the authorized user ID data D347 of the next work step of the work step concerned by referring to the monitoring and control procedure database 34.

When they are registered, the procedure progress database 36 is referred to, and it is confirmed whether or not there are users who are the allocation candidates whose time margin level data D369 of the work steps being executed are only "high". When there are users of such allocation candidates ("Yes" in step ST203), it is determined to provide the operation support by the proposal for the work allocation to the person requiring support, and the process proceeds to step ST204. In other cases ("No" in step ST203), the allocation is not possible, and it is determined that operation support in which the present status is presented and taking measures is encouraged is to be performed, and the process proceeds to step ST205.

In contrast, if the work status data D373 of the work step selected in step ST201 is "not initiated," the intra-team work status data D37 is referred to instead of the procedure progress database 36. Then, users whose time margin level data D376 for the next work steps is all "high" are selected, and the authorized user ID data D347 of the monitoring and control procedure database 34 is confirmed. If an authorized user ID for a user is registered, it is determined to provide the operation support by the proposal for the allocation to the user (proceed to step ST204). If the user ID is not registered, the allocation is not possible and the process proceeds to step ST205.

If the allocation is possible, the process proceeds to step ST204, and a signal indicating information to encourage the allocation of work for the other users is transmitted to the presentation information generation processing unit 23. The information to encourage the allocation of work includes information on the person requiring support and the allocation candidate, information on the work to be allocated, and information on the work from the supervisor, etc., which is extracted by referring to the intra-work status data D37. Specifically, the work user ID data D371 of the person requiring support and the allocation candidate, the procedure ID data D370 of the work step to be allocated, the work ID data D374 of the next work to be allocated, and the user ID of the supervisor are extracted and sent together with the signal indicating the implementation of support through the work allocation.

Upon receiving the signal described above, the operation support content determination processing unit 38 stores the information of the user ID of the allocation candidate in the allocation candidate user ID data D36a for the work step to be allocated in the procedure progress database 36. Thereafter, it is determined whether or not there is any user (operator), other than the candidate user of the allocation concerned, to whom the allocation has not been made (step ST206), and if there is a user, the process returns to step ST201 and is repeated, and if there is no user, the process is terminated.

If the allocation is not possible, the process proceeds to step ST205, and a signal indicating information meaning that work allocation is not possible is transmitted to the presentation information generation processing unit 23. Specifically, the procedure ID data D370, the work ID data D372, and the work ID data D374 of the next work in the work step having the smallest value of the margin time data D375, and the user ID of the supervisor are extracted, and transmitted together with a signal indicating the implementation of support without work substitution.

Back in FIG. 2, after each operation in step ST105 (ST201 to ST206 (FIG. 6)), the process proceeds to step ST106, and then the presentation information generation processing unit 23 generates the screen drawing data to be output to the output device 24 on the basis of the data transmitted by the operation support content determination processing unit 38. The presentation information generation processing unit 23 generates the operation support information to be output in accordance with a user to be the target for the presentation.

When a signal for the implementation of support by the work allocation is received, for example, the screen drawing data including the status of the operator identified as the person requiring support and a message recommending that the work be allocated for the candidate user of the allocation is generated for the supervisor user. Then, on the output device 24 associated with the user ID of the supervisor, for example, as shown in FIG. 7A, a monitoring screen G24 displays a message Gm24 stating that the work of the person requiring support (operator A in the figure) is tight, and recommending that the candidate user of the allocation (operator B in the same figure) should act as the substitute.

Screen drawing data of messages is generated, the messages notifying in advance that the candidate user of the allocation will take over (act as substitute) the next work for the person requiring support who is preferable to receive the support, and that there is a possibility of instructions for the candidate user of the allocation having the possibility of the support who is to perform the work concerned as the substitute. Then, in the output device 24 associated with the user ID of the person requiring support who is preferable to receive the support, as shown in FIG. 7B, for example, the message Gm24 is displayed in the monitoring screen G24, informing that there is a possibility that the candidate user of the allocation performs as a substitute for the certain work that is identified. Further, in the output device 24 associated with the user ID of the candidate user of the allocation who may be requested to act as a substitute, as shown in FIG. 7C, for example, the message Gm24 is displayed in the monitoring screen G24, informing that there is the possibility of requesting that the certain work identified for the person requiring support is performed as the substitute.

As a form of information presentation, the message may be output in a dedicated area in a part of the monitoring screen G24, or it may be output only for a certain period of time. If the allocation is not possible, for example, a message in which the operator under a high workload, and the procedure and the work of the monitoring and control that are under execution are stated is output to the supervisor user to encourage the support for the operation. Examples of the support information may include recommendation such as advice for the operation and consideration for an increase in the number of operator. When the presentation information generation signal indicating that there is no problem in the work progress is received from the team status evaluation processing unit 37, the screen drawing data for presenting the message Gm24 indicating that there is no problem may be generated, or the screen drawing data generation process may not be performed.

After the completion of step ST106, the process at the time when the operator who is allocated for the work (substitute user) performs the allocated work will be described below. The confirmation/operation signals input by the substitute user via the input device 21 are stored in the work history database 33 by the data processing unit 22. In the procedure completion confirmation process of the user work status estimation processing unit 35, the work execution status of the work history data concerned is determined, and after the data such as the work status data D364 and the work user ID data D365 are stored in the procedure progress database 36, the procedure progress database 36 is confirmed.

If the data is stored in the allocation candidate user ID data D36a for the work step concerned, it is determined that the work history data reflects the execution by the substitute user. After the above, the user work status estimation processing unit 35 transmits an update signal and a signal that indicates the execution of the allocated work and that includes the substitute user ID, the procedure ID, the work ID, and the user ID of the user who performs the procedure before the substitution, to the team status evaluation processing unit 37.

After performing the processes described above, the team status evaluation processing unit 37 transmits a signal indicating the execution of the allocated work to the operation support content determination unit 38. When receiving the signal of the execution of the allocated work concerned, the operation support content determination processing unit 38 performs a determination process for the operation support content described above, and at the same time generates a presentation information generation signal for presenting the execution status of the allocated work on the basis of the signal of the execution of the allocated work, and transmits it to the presentation information generation processing unit 23.

When receiving the presentation information generation signal concerned, the presentation information generation processing unit 23 generates screen drawing data for the supervisor and the operator A (replaced by substitute) who receives the operation support. For example, as shown in FIG. 8A, drawing data is generated to present the message Gm24 in the monitoring screen G24 indicating that the work is being performed by another operator B and is output to the output devices 24 of the supervisor and the operator A who is replaced by the substitute. Note that, in order to indicate that the substitution of the work is in progress, drawing data indicating that the substitution of work is in progress may be generated in the vicinity of the confirmation/operation targets (pumps, valves, plant values, etc.) on the monitoring screen G24.

In order to provide drawings on the monitoring screen, the presentation information generation processing unit 23 includes a screen database in which screen symbol parts constituting the monitoring screen G24 and the data of the drawing positions are associated with the data of the confirmation/operation target ID. Therefore, by acquiring the confirmation/operation target ID associated with the work ID from the work-related information in the work history database 33, it is possible to display a message related to the support of the work just around the screen symbol parts of the confirmation/operation target ID concerned. For example, as shown in FIG. 8B, an annotation Gr24 indicating that the work is being performed by the operator B as the substitute can be displayed for the screen symbol part Gs24 indicating the work target, so that the user can visually recognize the work to be supported. This can reduce the possibility that operator A, who is originally scheduled to perform the work, accidentally perform the work.

Namely, in Embodiment 1, when a member needs support due to a workload (identified as person requiring support), the possibility of the substitution by another member for the work that the member is in charge of is examined. Then, the examined information is presented in a form suitable for each of a plurality of persons including the person requiring the support in the team (for example, supervisor, member who is scheduled to act as substitute). Even when the status of the support needed is at a level that cannot be solved by an effort or ingenuity of the person requiring support, the cooperation of the team members enables optimal monitoring and control through the collaboration. In particular, in the plant monitoring and control, there are many matters that require expertise, and it is not easy to request support from others, but since a candidate to act as a substitute is selected from those with operation authority, it is possible to smoothly request the support. In addition, the person who needs support may not even be able to grasp that the person is in such a situation, but since the information is presented to other members, the work substitution is performed smoothly, enabling optimal monitoring and control through the collaboration.

In addition, the team members will be able to understand the workload status of others, regardless of whether they are in the monitoring and control room or in a remote location. Therefore, even if a candidate who can perform the work as a substitute cannot be selected, the person requiring the support can deal with the situation calmly because the person can be aware that the team understands the difficult situation, and thus the need for the substitution itself may be eliminated. On the basis of these, measures can be taken to improve the performance of the entire team, bringing about an effect to improve the accuracy of plant monitoring and control through the cooperation.

Although Embodiment 1 shows an example in which messages are generated for the supervisor and operators related to the work substitution, the messages indicating work substitution between operators may be generated and presented to other team members. Further, in Embodiment 1, as described referring to FIGS. 7 and 8, an example is shown in which the operation support information (for example, message Gm24) is output to the same screen as the monitor screen G24 of the plant, but the operation support information may be displayed on another output device 24. Further, the presentation form of the operation support information is not limited to that by the screen display, and may be individually presented to a user by voice, for example.

Further, in Embodiment 1, as an example, the operation support information for the proposal of the work allocation or for calling for the attention of the specific operators is presented, but the content of the operation support information is not limited to the above. Further, in Embodiment 1, an example is shown in which, after a message recommending that the work of a specific operator be allocated to another operator is presented to the supervisor user, the supervisor directly instructs the another operator to perform the work as the substitute. However, this is not a limitation. For example, a button (for example, approval/disapproval) for inputting whether or not the work is to be performed by the substitute is displayed first together with the message concerned on the monitor screen G24 of the supervisor. Then, when the content of the proposed operation support is approved according to the displayed content, a message instructing the substitute operator B to act as the substitute and a message giving prior notice of the substitution to the operator A who is to be replaced by the substitute may be output.

Further, in Embodiment 1, an example is shown in which the message indicating the status of the operator who has a problem in the work progress status is presented for the supervisor, but this is not a limitation. For example, a screen on which the operator status can be listed may be provided separately for the supervisor, and screen drawing data indicating the procedure progress status of all the operators may be generated and output on the basis the intra-team work status data D37.

In addition, in Embodiment 1, although the workload of the operators is taken as an example, the content of the monitoring and control procedure may be extended to the procedure of the supervisor (confirmation/operation instructions to operators, confirmation of work result of operators, etc.) to evaluate the workload of the supervisor. Furthermore, information such as the workload status of the supervisor may be presented to the output device 24 of an organization outside the plant operation team (for example, organization providing operation assistance) so that measures can be taken to improve the team performance in which the supervisor is also included.

Note that, it is conceivable that a part within the monitoring and control unit 2 and the operation support processing unit 3 in the plant monitoring and control system 1 that performs arithmetic processing may be configured by a single piece of hardware 10 equipped with a processor 11 and a storage device 12, as shown in FIG. 9. The storage device 12 includes a volatile storage device such as a random access memory, and a non-volatile auxiliary storage device such as a flash memory that are not shown. In addition, an auxiliary storage device of a hard disk instead of the flash memory may be included. The processor 11 executes a program input from the storage device 12. In this case, the program is input to the processor 11 from the auxiliary storage device through the volatile storage device. Further, the processor 11 may output data such as calculation results to the volatile storage device of the storage device 12, or may store the data in the auxiliary storage device via the volatile storage device. This is also true for the plant monitoring and control apparatus 1 of the following Embodiment 2.

Embodiment 2

In Embodiment 1 described above, an example is described in which the progress status of the actions such as the confirmation/operation of the operators is focused, the work load is estimated on the basis of the margin time of the work, and the operation support such as the work allocation of the operator whose workload is high is provided. Here, factors affecting the execution of work such as the urgency of the work of an operator are not only due to the nature of the work itself such as the amount of the work and the time required for the work, but also due to a mental load of the operator caused by the time pressure during the execution of the work and the difficulty of the work, etc. If such mental load status can be estimated and shared within the team before delays in work progress is reflected in the behavior, various measures can be taken to improve performance of the team before work becomes urgent and actions to be taken is limited.

Figure 10:
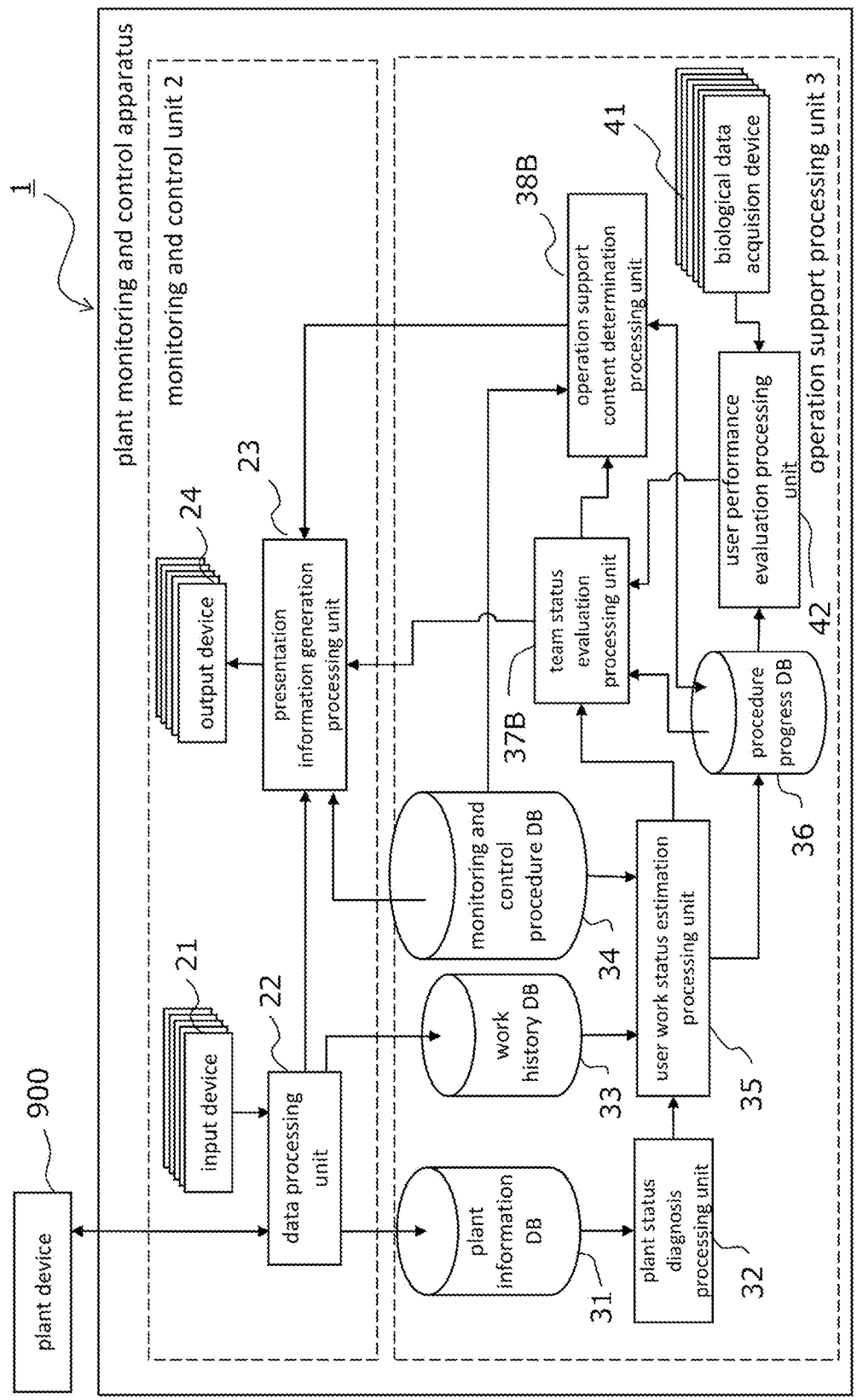
FIG. 10 is a block diagram for describing a configuration of a plant monitoring and control apparatus according to Embodiment 2.

In consideration of the above, in Embodiment 2, an example will be described in which operator performance status is estimated by psychological workload and situation awareness ability to determine the necessity of support and then the operation support is performed. FIG. 10 to FIG. 13 are diagrams for describing a plant monitoring and control apparatus or a plant monitoring and control method according to Embodiment 2, FIG. 10 is a block diagram for describing a configuration of a part mainly relating to presentation of information in the plant monitoring and control apparatus, FIG. 11 is a diagram illustrating an example of data for each of items of intra-team performance status data that is generated by a team status evaluation processing unit and that shows the performance status from the viewpoint of mentality of the operators in the team.

Figure 12:
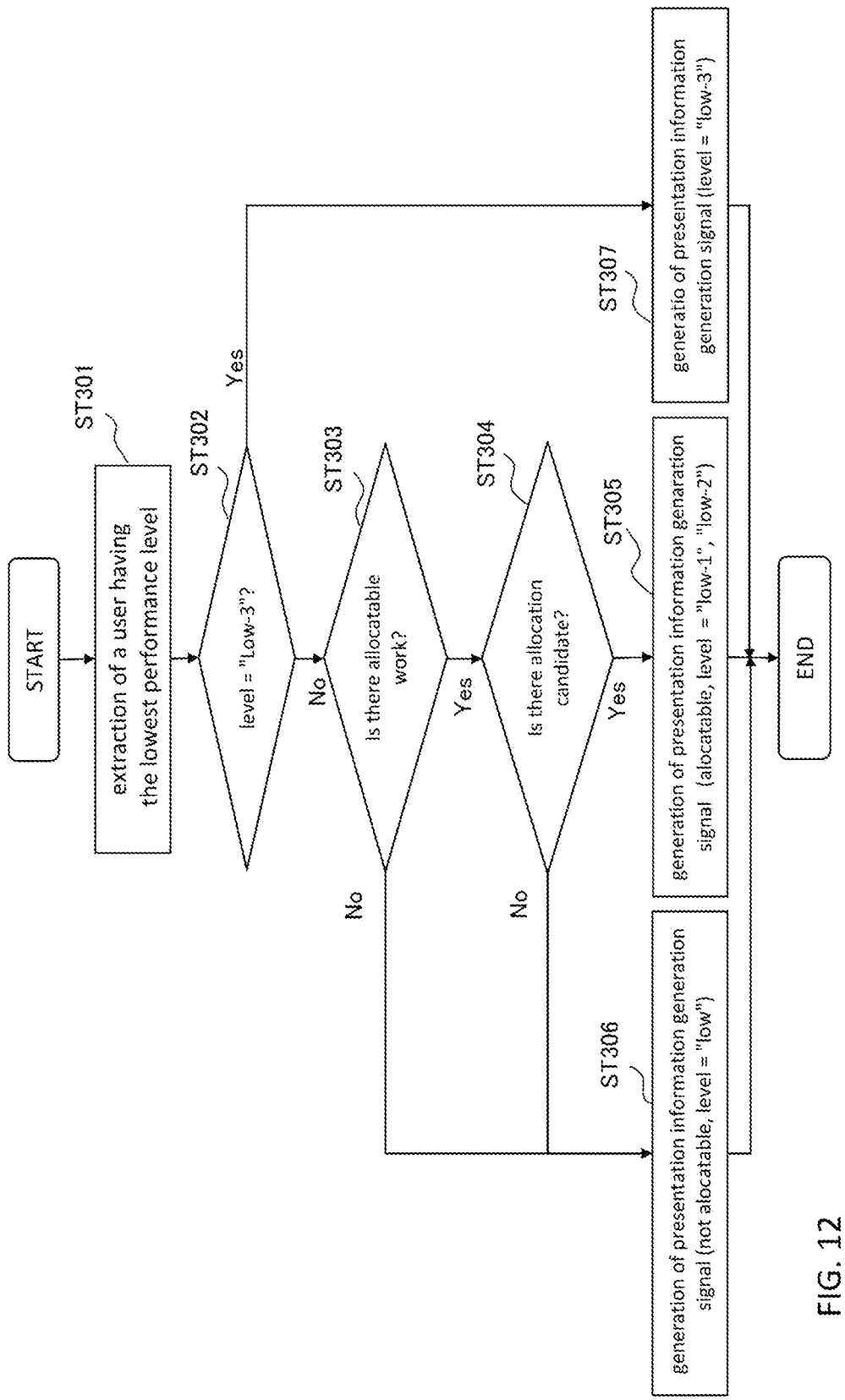
FIG. 12 is a flowchart for describing operation in steps of determining operation support content from a viewpoint of a performance level of a user in a plant monitoring and control method according to Embodiment 2.
Figure 13:
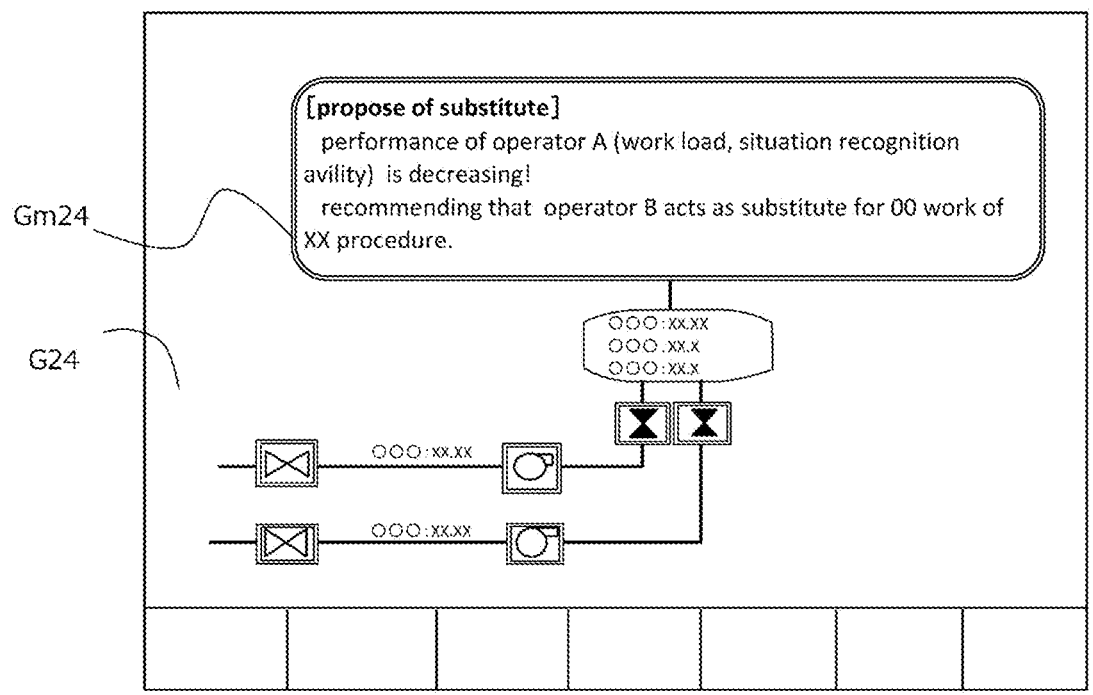
FIG. 13 is a diagram illustrating an example of a screen display of operation support information at a time when a substitute for certain work is proposed, from the viewpoint of the performance level of a user in the plant monitoring and control apparatus according to Embodiment 2

Further, FIG. 12 is a flow chart for describing operation in steps of determining operation support content on the basis of the performance of a user in the plant monitoring and control method, and FIG. 13 is a diagram illustrating an example of a screen display of operation support information at a time when a substitute for certain work is proposed from the viewpoint of the performance level of a user. In the same part as that of Embodiment 1, the figures used in Embodiment 1 are appropriately referred to, and an example will be described in which operation status as a team is evaluated in accordance with the performance status of the operators in Embodiment 2, and the operation support content is determined and the information thereof is presented.

As shown in FIG. 10, in the plant monitoring and control apparatus 1 according to Embodiment 2, a biological data acquisition apparatus 41 and a user performance evaluation processing unit 42 are added to FIG. 1 that is described in Embodiment 1. The biological data acquisition device 41 is a device for acquiring biological data such as a user's heartbeat or voice. The user performance evaluation processing unit 42 evaluates psychological workload and situation awareness ability for each of the users by using the biological data acquired from the biological data acquisition device 41 and the data stored in the procedure progress database 36. Then, a process for estimating the performance status of each user is performed on the basis of the evaluation result.

The overall flow of the operation will be described below. In Embodiment 2, the process (step ST102) of the user work status estimation processing unit 35 described in FIG. 2 of Embodiment 1 is performed in the same manner as in Embodiment 1. However, in parallel with the process, biological data acquisition by the biological data acquisition device 41 and performance evaluation of each user (operator) by the user performance evaluation processing unit 42 are also performed.

A team status evaluation processing unit 37B of Embodiment 2 newly evaluates the team status on the basis of an output from the user performance evaluation processing unit 42 as contrasted with the team status evaluation processing unit 37 described in Embodiment 1. Further, the processes up to the generation of the intra-team work status data D37 in step ST103 described with reference to FIG. 5 are the same as those in Embodiment 1.

Further, in step ST104 of Embodiment 2, when it is determined that there is a work step that is temporally urgent in the intra-team work status data D37, the processes up to the following step ST106 is the same as those in Embodiment 1. In contrast, when it is determined that there is no temporally urgent work, the necessity of the operation support based on the mental status of the user is also determined on the basis of the output from the user performance evaluation processing unit 42.

For example, the team status evaluation processing unit 37B generates intra-team performance status data D43 (details will be described later) containing the performance level that comprehensively represents a mental status and transmits the data to an operation support content determination processing unit 38B. Note that, as contrasted with the processes described in Embodiment 1, the processing unit for executing processes newly added in Embodiment 2 is distinguished from the "processing unit" described in Embodiment 1 by adding "B" to the end of the reference numerals in order to show the difference in operation.

The operation support content determination processing unit 38B of Embodiment 2 determines the operation support information in accordance with the user performance, in addition to the processes in the operation support content determination unit 38 described in Embodiment 1. Receiving the result above, a presentation information generation processing unit 23B generates screen drawing data of the operation support information for each user and outputs it to the output device 24 so that it can be understood whether the support is determined on the basis of the work time or the user performance.

The operation will be described in detail. The biological data acquisition device 41 acquires biological data such as a heartbeat or voice of each user and is assigned to each user. In the biological data acquisition device 41, there are separate devices for the acquisition of the heartbeat and the voice, each of which is assigned an ID to be distinguished and is associated with a user ID. In the case of the heartbeat, a wearable heartbeat sensor or the like is used to acquire heartbeat variability data. In the case of the voice, voice data acquired from a microphone is recognized in real time to acquire text data. The acquired data is transmitted to the user performance evaluation processing unit 42.

The user performance evaluation processing unit 42 uses the acquired data to evaluate the psychological workload and situation awareness ability of the users. For example, heartbeat variability data is used to evaluate the psychological workload. The heartbeat variability data is continuously transmitted in a time series from the biological data acquisition device 41. For example, a method using heartbeat variability analysis is known as a method for evaluating the psychological workload. A frequency analysis is performed on the time-series data of the heartbeat variability to extract high-frequency (HF) and low-frequency (LF) components, and if the ratio of these components, LF/HF, exceeds a certain value (for example, 1.5 or higher), the psychological workload is determined to be high, and if not, it is determined to be low. Note that, as described above, LF/HF may be used for the determination for all users by setting a threshold value in advance, or it may be set for each user. This method of evaluating the psychological workload is an example and this method is not a limitation.

The situation awareness ability, for example, is evaluated in accordance with the time from the time when the supervisor user gives instructions by speaking to the operator user to the time when the operator user initiates the work. When the supervisor user makes a speech, the biological data acquisition device 41 performs voice-to-text conversion and it is transmitted to the user performance evaluation processing unit 42. When data is stored in the procedure progress database 36 (after one or more events are identified), the voice text data is compared with the data in the procedure progress database 36, the work ID of the work instructed by the supervisor's speech is identified, and the time (instruction start time) is stored.

Thereafter, when the work (confirmation/operation) is performed by the operator user, data of a new work step is stored in the procedure progress database 36. The user performance evaluation processing unit 42 refers to the procedure progress database 36 in a predetermined cycle and confirms whether or not there is the work ID data D363 of a work step that matches the work ID of the work instructed by the speech. If they are matched, a time difference is calculated by subtracting the stored instruction start time from the time (work start time). If the calculated time difference is shorter than a predetermined threshold time, it is determined that the operator is appropriately recognizing and acting on the supervisor's instructions, and it is determined that the operator has a high level of situation awareness ability. In contrast, when the time difference is longer than the threshold time, it is determined that the situation awareness ability is low because the situation awareness ability is decreasing or the situation awareness is not correctly performed.

Once the results of the psychological workload and situation awareness ability evaluations of the users are complete, they are combined to evaluate the performance of the users that depends on the mental load. For example, a performance evaluation table shown in Table 1 is used to determine a type of performance status in accordance with the combination of the psychological workload and the situation awareness ability.

Table 1

TABLE 1

Criterion for the performance level depending on mental load

| | Mental load index | | |
|---|---|---|---|
| | Psychological workload level | Situation awareness level | Performance level |
| Status | low | high | high |
| | high | low | low-1 |
| | high | high | low-2 |
| | low | low | low-3 |

In Table 1, if the psychological workload level is low and the situation awareness level is high, it is determined that the mental load is low and the user's performance is at a high level ("high"). If the psychological workload level is high and the situation awareness level is low, it is determined that the performance is at the lowest level ("low-1") in which the mental load is high, and the user cannot recognize the situation properly because of a high load applied thereto. If the psychological workload level is high and the situation awareness level is high, it is determined that the performance is at the second lowest level ("low-2") in which the user is feeling the load but is able to recognize the situation appropriately. If the psychological workload level is low and the situation awareness level is low, it is determined that the performance is at the third lowest level ("low-3") in which the user is not feeling the load but the situation awareness is not appropriate; for example, the user may be distracted. Thereafter, the determined performance level data and the user ID are then transmitted to the team status evaluation processing unit 37B.

The team status evaluation processing unit 37B generates the intra-team work status data D37 shown in FIG. 5, as in Embodiment 1, and determines whether or not the operation support in consideration of the team status is necessary. If there is work of which the time margin level data D376 of the next work is "low," the processes in step ST201 to ST206 are performed as in Embodiment 1.

If not, in Embodiment 2, it is determined whether or not there is a need for the operation support in the viewpoint of the user's mental load. When the performance level is "low" such as "low-1", "low-2", or "low-3", it is determined that the operation support is necessary, and the intra-team performance status data D43 as shown in FIG. 11 is generated and transmitted to the operation support content determination processing unit 38B. In contrast, when the performance level of the user is only "high", a presentation information generation signal indicating that there is no problem in the work is generated and transmitted to the presentation information generation processing unit 23.

When receiving the intra-work status data D37, the operation support content determination processing unit 38B performs the same processes as that in Embodiment. In contrast, when the intra-team performance status data D43 is received, the operation support information in accordance with the performance status of the user is generated as shown in FIG. 12. First, performance level data D435 of the intra-team performance status data D43 is referred to, and a user having the lowest performance level among the users having the "low" performance level is extracted as the candidate user requiring the support (step ST301).

When the performance level of the extracted candidate user requiring the support is "low-1" or "low-2", work allocation is necessary, and when the performance level is "low-3", work allocation is unnecessary, and thus it is determined whether or not the work allocation is necessary; namely, whether or not the performance level is "low-3" is determined (step ST302). When the performance level is "low-1" or "low-2" ("No" in step ST302); namely, when the level of the extracted candidate user requiring the support as the lowest level is "low-1" or "low-2", the person requiring support especially needs work allocation, and thus the work allocation is to be considered.

First, it is determined whether or not there is work that can be allocated within the work to be performed next by the person requiring support (step ST303). If there is work "under execution" in work status data D433, work status ID data D434 of the next work to be executed by the person requiring support is referred to. Among the procedure progress database 36, the condition data D362 of the work ID data D363 identical to the referred ID data D434 of the next work is referred to. If the condition data D362 includes "AND" work (work that can be performed in parallel), the work ID data D363 of which the work status data D364 is "not initiated" is acquired among the work steps to which the same "AND" condition is given. For example, with respect to the work of which the work ID data D432 of the current work in FIG. 11 is "S002", the work step of which the work ID data of FIG. 4A is "S003" is acquired, and it is determined that there is the work that can be allocated ("Yes" in step ST303).

If there is no such work step, the procedure progress database 36 is referred to and it is confirmed whether or not work allocation is possible in other procedures in which work is performed by the person requiring support. In other words, using the same work user ID data D365 as the work user ID data D431 of the person requiring support, it is to be confirmed within the other procedures (procedures with different procedure ID data D360) as follows. A work step next to the work step of which the work status data D364 of the person requiring support is "under execution" or a work step that is completed up to an intermediate work step but the remaining is "not executed" is acquired. For example, the work step whose work ID data is "S022" in FIG. 4B is acquired, and it is determined that there is work that can be allocated ("Yes" in step ST303).

If the work step corresponding to the above is not found in step ST303 ("No" in step ST303), the allocation is not possible. Therefore, for example, a process for presenting information is performed such that the situation where the work allocation is not possible but there is a user with a low performance level, etc. is presented to encourage the supervisor to take measures (step ST306). Note that, in the case where there is no work "under execution" in the work status data D433 of the person requiring support, the user concerned is not currently performing work but there is a performance problem, and then the process in step ST306 is performed in the same way.

If it is determined in step ST303 that there is work that can be allocated, whether or not there are users (allocation candidate) who can perform the work as a substitute is determined (step ST304). The monitoring and control procedure database 34 is referred to, and whether or not user IDs of users other than the person requiring support are registered in the authorized user ID data D347 of the acquired work step is confirmed. If they are registered, the intra-team performance status data D43 is referred to and whether or not there is a user whose performance level data D435 is "high is confirmed. If there is such a user ("Yes" in step ST304), the user is determined as a candidate user of the allocation to provide operation support by the proposal of the allocation for the work of the person requiring support, and the process proceeds to step ST305. In the other case ("No" in step ST304), the allocation is not possible and the process proceeds to step ST306 described above.

In the case where the operation support to encourage the work allocation is performed, the intra-team performance status data D43 is referred to, and for example, the data as follows is collected: the work user ID data D431 for each of the person requiring support and the candidate user of the allocation; the work user ID data D431 for the person requiring support; the procedure ID data D430 and the work ID data D432 of the current work and the ID data D434 of the next work in the work step of the allocation; and the user ID data of the supervisor. For example, a specific performance level ("low-1" or "low-2") is presented together with the collected data, and a presentation information generation signal indicating the implementation of support by the work allocation due to the level is transmitted to the presentation information generation processing unit 23 (step ST305).

In contrast, in the case where the performance level of the extracted candidate user requiring support is "low-3" ("Yes" in step ST302), it is determined that the support such as calling for the attention is necessary but it is not necessary to propose the work allocation. And a process for presenting to the supervisor the information such as presenting a status in which the level of a candidate user requiring support is "low-3" and encouraging the supervisor to take measures such as calling for the attention is performed (step ST 307). Specifically, the work user ID data D431 of the candidate user requiring support; the procedure ID data D430, the work ID data D432, and the work ID data D434 of the next work that are the data of which the candidate user requiring support executes; and the user ID data of the supervisor are collected. Then, together with the collected data, the presentation information generation signal indicating the implementation of support for encouraging measures taken for the performance level "low-3" is transmitted to the presentation information generation processing unit 23.

When it is determined that the allocation is possible and the process in step ST305 is performed, the presentation information generation processing unit 23B generates screen drawing data for each user to be output to the output device 24 on the basis of the data transmitted by the operation support content determination processing unit 38B. For example, when the performance level is "low-1" or "low-2," the screen drawing data of a message including the status of the operator concerned and recommending that the work be allocated to another operator is generated for the supervisor.

Then, as shown in FIG. 13, a message Gm24 is displayed in the monitoring screen G24 of the output device 24 associated with the user ID of the supervisor, stating that the performance of the person requiring support is decreasing and recommending that the candidate user of the allocation acts as a substitute. For each of the person requiring support and the candidate user of the allocation, screen drawing data of the message Gm24 for prior notice of the allocation similar to FIG. 7B and FIG. 7C in Embodiment 1 is generated and output in the monitoring screen G24.

In contrast, when it is determined that the allocation is not possible and the process in step ST306 is performed, information proposal for calling for the attention is presented. For example, a message in which the status of the operator being identified as the person requiring support and having performance decrease (factors causing decrease in performance such as increased psychological workload and decreased situation awareness ability), and the monitoring and control procedure and work that are under execution are stated is output to the supervisor to encourage the support for the operation. When the performance level is "low-3", a message is output, for example, to the supervisor in order to call for the attention of the operator identified as the candidate user requiring support. The process at the time when the operator who is allocated for the work (candidate user of allocation) performs the allocated work is the same as that described in Embodiment 1.

That is, in Embodiment 2, when the performance level of a certain member decreases due to a mental load (psychological workload, decreased situation awareness ability) and support is required (identified as person requiring support), the possibility of substitution by another member for the work in charge is examined. Then, the examined information is presented in a form suitable for each of a plurality of persons including the person requiring support in the team (for example, supervisor, member who is scheduled to act as substitute). As a result, even when the status of the support needed is at a level of the problem that cannot be solved by an effort or ingenuity of the person requiring support, the cooperation of the team members enables optimal monitoring and control through the collaboration. In particular, in the plant monitoring and control, there are many matters that require expertise, and it is not easy to request support from others, but since a candidate to act as a substitute is selected from those with operation authority, it is possible to smoothly request the support. In addition, the person requiring support may not even be able to grasp that the person is in such a situation, but since the information is presented to other members, work substitution can be smoothly performed, enabling optimal monitoring and control through the collaboration.

In addition, the team members will be able to understand the workload status of others, regardless of whether they are in the monitoring and control room or in a remote location. Therefore, even if a candidate who can perform the work as a substitute cannot be selected, the mental load of the person requiring support is reduced because the person is aware that the team understands the difficult situation, and the need for the substitution itself may happen to be eliminated. On the basis of these, measures can be taken to improve the performance of the entire team, bringing about an effect to improve the accuracy of plant monitoring and control through collaboration.

Note that, while Embodiment 2 shows an example of estimating the performance status of the user by the mental load using the psychological workload and the situation awareness ability as indexes, only one of the indexes of the mental load may be used. Furthermore, different indexes may be combined. Further, when evaluating the psychological workload or the situation awareness ability, the user performance evaluation processing unit 42 evaluates that the performance is decreased when a certain threshold value is exceeded. However, without immediate determination, it may evaluate that the performance is decreasing if the determination for the state is consistent for a certain period of time or a certain number of times.

Further, although the example is described in which the heartbeat variability data is used for the evaluation of the psychological workload, this is not a limitation, and for example, voice frequency, a shake in the voice, and the like may be used as the index. Further, the timing regarding the speech for the evaluation of the situation awareness ability is not necessarily limited to the timing depending on the audio data, and may be specified, for example, by the timing at which the instructions are displayed on the output device or the timing at which the audio signal is output from the output device.

The need for support may be determined by the status of the performance level in preference to the operation status of the user, or it may be determined by the individual evaluation. Furthermore, for example, even in a case where a person observes a certain operator and intuitively feels that the operator needs support, it may be possible to separately select the operator as an evaluation target to be a candidate user requiring support by inputting such information into the input device 21. In that case, if the supervisor determines that the user truly needs support, the candidate user may be registered as a person requiring support, and the support content described in FIG. 6 may be determined therefor. Even in this case, the performance of the team can be improved in such a way that the work of the person requiring support is performed by a substitute in the team who has energy to spare for the work.

Further, although Embodiment 2 shows an example in which messages are generated for the supervisor and operators related to the work substitution, the messages indicating work substitution between operators may be generated and presented to other team members. As an example, the operation support information for the proposal of the work allocation or for calling for the attention of the specific operator is presented, but the content of the operation support information is not limited to the above.

Further, in Embodiment 2, an example is shown in which the message indicating the status of the operator whose performance is decreasing, but this is not a limitation. For example, a screen on which the performance status of the operators can be listed may be separately provided for the supervisor, and screen drawing data indicating the performance status of all the operators may be generated and output on the basis the intra-team performance status data D43. Furthermore, on the basis of the intra-team work status data D37, screen drawing data indicating the work progress and performance status of all operators together may be generated and output.

In addition, in Embodiment 2, although an example is shown in which the performance is evaluated on the basis of the mental load of an operator, the content of the monitoring and control procedure may be extended to the procedure of the supervisor and the user data of the supervisor is acquired so that the performance of the supervisor may be evaluated. Furthermore, information such as the workload status and the mental load status of the supervisor may be presented to the output device 24 of an organization outside the plant operation team so that measures can be taken to improve the performance of the team including the supervisor.

Note that, although various exemplary embodiments and examples are described in the present application, various features, aspects, and functions described in one or more embodiments are not inherent in a particular embodiment, and can be applicable alone or in their various combinations to each embodiment. Accordingly, countless variations that are not illustrated are envisaged within the scope of the art disclosed herein. For example, the case where at least one component is modified, added or omitted, and the case where at least one component is extracted and combined with a component in another embodiment are included.

As described above, according to the plant monitoring and control apparatus 1 of each embodiment, the plant monitoring and control apparatus 1 for the monitoring and controlling the plant (having the plurality of plant devices 900) in cooperation with the plurality of members (users) is configured to be provided with: the input/output unit (input device 21, output device 24) which is provided for each of the plurality of members and accepts input/output operations for the monitoring and control; the monitoring and control procedure database 34 in which the work content (work content data D345) and the identification information (authorized user ID data D347) are recorded in association therewith, the work content being for each of the plurality of pieces of work for each of the monitoring and control procedures determined in advance according to the events that can occur in the plant, and the identification information being of the members having operation authority of the work concerned among the plurality of members; the procedure progress database 36 in which the progress status (work status data D364) for each of the plurality of pieces of work for each procedure and the identification information (work user ID data D365) of the member who is performing or to be in charge of the work concerned are associated with each other and the associated record is updated in response to the input/output operations and the occurrence of the events; the status evaluation unit (team status evaluation processing units 37, 37B) which evaluates the status (workload, mental load, etc.) of each of the plurality of members, determines whether or not there is a member requiring support on the work in the monitoring and control, and identifies the member, in response to the update of the record of the procedure progress database 36; the support content determination unit (operation support content determination processing units 38, 38B) which extracts the work scheduled to be performed by the identified member (person requiring support) from the information recorded in the procedure progress database 36 when the member requiring support is identified, determines the possibility of substitution by the member having the operation authority for the extracted work from the information recorded in the monitoring and control procedure database 34, and determines the information relating to the substitution of the extracted work (calling for attention is included when no substitution is needed) as the support content; and the presentation information generation unit (presentation information generation processing units 23, 23B) which selects a plurality of persons including the identified member (person requiring support) from the plurality of members as the presentation targets of the support content and generates the presentation information in accordance with each of the selected persons on the basis of the support content that is determined. Therefore, when a member falls into a situation that causes trouble in the work, the work assigned to the member can be smoothly performed as a substitute by another member having the operation authority, and thus this is more effective when the situation is at a level of a problem that cannot be solved by individual efforts or ingenuity alone. In particular, in the plant monitoring and control, there are many matters that require expertise and the range of work is limited, and thus it is not easy to request support from others, but since the candidate to act as a substitute is selected from those with the operating authority, it is possible to smoothly request the support. In addition, the person requiring support may not even be able to grasp that the person is in such a situation, but since the information is presented to other members, work substitution can be smoothly performed, enabling optimal monitoring and control through the collaboration.

In particular, if the status evaluation unit (team status evaluation processing unit 37) calculates the time margin (margin time data D368, time margin level data D369) of each of the plurality of members for the work being under execution and scheduled to be performed and identifies the member whose time margin is calculated to be lower than a standard as the member requiring support, the member requiring support can be accurately identified.

In addition, the mental load evaluation unit (user performance evaluation processing unit 42) for evaluating the magnitude of the mental load of each of the plurality of members is provided, and if the status evaluation unit (team status evaluation processing unit 37B) identifies a member whose mental load is evaluated to be greater than a standard (user performance is lower than standard) as a member requiring support, the member requiring support can be accurately identified from the mental aspect.

In this case, a biological data acquisition device 41 is provided to acquire the biological data of each of the plurality of members, and the mental load evaluation unit (user performance evaluation processing unit 42) evaluates the mental load of each of the plurality of members on the basis of the biological data acquired by the biological data acquisition device 41, so that the mental load can be quantitatively evaluated.

Further, the support content determination units (operation support content determination processing units 38 and 38B) estimate the time margin (margin time data D368 and time margin level data D369) for the work being under execution and scheduled to be performed for the member having the operation authority for the extracted work and select a member having the estimated time margin higher than a standard as a substitute of the extracted work, so that an optimum substitute can be selected.

Furthermore, according to the plant monitoring and control method of each embodiment, the plant monitoring and control method for monitoring and controlling the plant (having the plurality of plant devices 900) in cooperation with the plurality of members (users) is configured to include: a step of associating the work content (work content data D345) with the identification information (authority user ID data D347) and recording them in the monitoring and control procedure database 34, the work content being for each of the plurality of pieces of work for each of the monitoring and control procedures determined in advance according to the events that can occur in the plant, and the identification information being of the members having the operation authority of the work concerned among the plurality of members; a step of associating the progress status (work status data D364) for each of the plurality of pieces of work for each of the procedures with the identification information (work user ID data D365) of the member who is performing or to be in charge of the work concerned and updating the record in the procedure progress database 36 in response to the input/output operations for the monitoring and control and the occurrence of the events (steps ST101, ST102); a status evaluation step of evaluating the status (workload, mental load, etc.) of each of the plurality of members and determining whether there is a member requiring support on work in the monitoring and control, and identifying the member, in response to the update of the record of the procedure progress database 36 (step ST103, ST104); a support content determination step of extracting the work scheduled to be performed by the identified member (person requiring support) from the information recorded in the procedure progress database 36 when the member requiring the support is identified, determining the possibility of substitution by the member having the operation authority for the extracted work from the information recorded in the monitoring and control procedure database 34, and determining the information on the substitution of the extracted work (calling for attention is included when no substitution is needed) as the support content (step ST105); and a presentation information display step of selecting a plurality of persons including the identified person from the plurality of members as the presentation targets of the support content and generating and displaying the presentation information in accordance with each of the selected persons on the basis of the support content that is determined (step ST106). Therefore, when a member falls into a situation that causes trouble in the work, the work assigned to the member can be smoothly performed by a substitute of another member having the operation authority, and thus this is more effective when the situation is at a level of a problem that cannot be solved by individual efforts or ingenuity alone. In particular, in the plant monitoring and control, there are many matters that require expertise and the range of work is limited, and thus it is not easy to request support from others, but since a candidate to act as a substitute is selected from those with the operating authority, it is possible to smoothly request the support. In addition, the member requiring support may not even be able to grasp that the person is in such a situation, but since the information is presented to other members, work substitution can be smoothly performed, enabling optimal monitoring and control through the collaboration.

DESCRIPTION OF REFERENCE NUMERALS AND SIGNS 1 plant monitoring and control apparatus, 2 monitoring and control unit, 3 operation support processing unit, 21 input device, 22 data processing unit, 23, 23B presentation information generation processing unit, 24 output device, 31 plant information database, 32 plant status diagnosis processing unit, 33 work history database, 34 monitoring and control procedure database, 35 user work status estimation processing unit, procedure progress database, 37, 37B team status evaluation processing unit, 38, 38B operation support content determination processing unit, 41 biological data acquisition device, 42 user performance evaluation processing unit, 900 plant device, D37 intra-team work status data, D43 intra-team performance status data

The invention claimed is:
1. A plant monitoring and control apparatus for monitoring and controlling a plant in cooperation with a plurality of members, the plant monitoring and control apparatus comprising:

an input/output interface which is provided for each of the plurality of members and accepts input/output operations for the monitoring and control of the plant;
a plant information database that accumulates time-series information from devices operating within the plant a processor configured to monitor data stored in the plant information database information and identify at least one service event that occurs within the plant based on the accumulated time-series information;
a first database in which work content and identification information are recorded in association therewith, the work content being for a plurality of pieces of work for monitoring and control procedures determined in advance according to plural service events that can occur in the plant, and the identification information being of members having an operation authority of a work concerned among the plurality of members;
a second database in which progress status for each of the plurality of pieces of work for each of procedure being performed in response to the at least one identified service event and identification information of a member who is performing or to-be in charge of the work concerned are associated with each other in a record and the associated record is updated in response to the input/output operations and occurrence of the at least one identified service event;
the processor is configured to evaluate a status of each of the plurality of members, determine whether or not there is a member requiring support in completing work associated with the at least one of identified service event, and identify the member, in response to the update of the associated record of the second database;
the processor is configured to extract work scheduled to be performed by the identified member to complete the at least one identified service event from information recorded in the second database when the member requiring the support is identified, determine a possibility of substitution by a member having the operation authority for the extracted work from information recorded in the first database, and determine information relating to the substitution of the extracted work as support content;
the processor is configured to select a plurality of persons including the identified member as presentation targets of the support content from the plurality of members and generate presentation information in accordance with each of the selected persons on the basis of the support content that is determined for display to one or more of the plurality of members through an associated input/output interface; and
the associated input/output interface generates a message that is sent to an input/output interface of the identified member for instructing the identified member to substitute for the member requiring support to complete the at least one identified service event.

2. The plant monitoring and control apparatus according to claim 1, wherein the processor calculates a time margin of each of the plurality of members in a work being under execution and scheduled to be performed, and identifies a member whose time margin is calculated to be lower than a standard as the member requiring the support.

3. The plant monitoring and control apparatus according to claim 1, wherein the processor evaluates a magnitude of a mental load of each of the plurality of members, and identifies a member whose mental load is evaluated to be larger than a standard as the member requiring support.

4. The plant monitoring and control apparatus according to claim 2, wherein the processor evaluates a magnitude of a mental load of each of the plurality of members, and identifies a member whose mental load is evaluated to be larger than a standard as the member requiring support.

5. The plant monitoring and control apparatus according to claim 3, further comprising one or more sensors to acquire biological data of each of the plurality of members, wherein the processor evaluates the mental load of each of the plurality of members on the basis of the biological data acquired by the one or more sensors.

6. The plant monitoring and control apparatus according to claim 4, further comprising one or more sensors to acquire biological data of each of the plurality of members, wherein the processor evaluates the mental load of each of the plurality of members on the basis of the biological data acquired by the one or more sensors.

7. The plant monitoring and control apparatus according to claim 1, wherein the processor estimates time margins of a work being under execution and scheduled to be performed for the members having the operation authority for the extracted work, and selects a member having the estimated time margin higher than a standard as a substitute for the extracted work.

8. The plant monitoring and control apparatus according to claim 2, wherein the processor estimates time margins of the work being under execution and scheduled to be performed for the members having the operation authority for the extracted work, and selects a member having the estimated time margin higher than a standard as a substitute for the extracted work.

9. The plant monitoring and control apparatus according to claim 3, wherein the processor estimates time margins of a work being under execution and scheduled to be performed for the members having the operation authority for the extracted work, and selects a member having the estimated time margin higher than a standard as a substitute for the extracted work.

10. The plant monitoring and control apparatus according to claim 4, wherein the processor estimates time margins of the work being under execution and scheduled to be performed for the members having the operation authority for the extracted work, and selects a member having the estimated time margin higher than a standard as a substitute for the extracted work.

11. The plant monitoring and control apparatus according to claim 5, wherein the processor estimates time margins of a work being under execution and scheduled to be performed for the members having the operation authority for the extracted work, and selects a member having the estimated time margin higher than a standard as a substitute for the extracted work.

12. The plant monitoring and control apparatus according to claim 6, wherein the processor estimates time margins of the work being under execution and scheduled to be performed for the members having the operation authority for the extracted work, and selects a member having the estimated time margin higher than a standard as a substitute for the extracted work.

13. A plant monitoring and control method for monitoring and controlling a plant in cooperation with a plurality of members, the method comprising:
- a step of accumulating, by a plant information database, time-series information from devices operating within the plant and storing the accumulated time-series information;
- a step of monitoring data stored in the plant information database information and identifying at least one service event that occurs within the plant based on the accumulated time-series information;
- a step of associating work content with identification information and recording them in a first database, the work content being for each of a plurality of pieces of work for monitoring and control procedures determined in advance according to plural service events that can occur in the plant, and the identification information being of members having an operation authority of a work concerned among the plurality of members;
- a step of associating progress status for each of the plurality of pieces of work for each procedure being performed in response to the at least one identified service event with identification information of a member who is performing or in charge of the work concerned and updating a record in a second database in response to input/output operations for the monitoring and control of the plant and occurrence of the at least one identified service event;
- a step of evaluating a status of each of the plurality of members and determining whether or not there is a member requiring support in completing work associated with the at least one of identified service event, identifying the member, in response to the update of the record of the second database;
- a step of extracting work scheduled to be performed by the identified member to complete the at least one identified service event from information recorded in the second database when the member requiring the support is identified, determining a possibility of substitution by a member having the operation authority for the extracted work from information recorded in the first database, and determining information relating to the substitution of the extracted work as support content;
- a step of selecting a plurality of persons including the identified member as presentation targets of the support content from the plurality of members and generating and displaying presentation information in accordance with each of the selected persons on the basis of the support content that is determined for display to one or more of the plurality of members through an associated input/output interface; and
- the associated input/output interface generates a message that is sent to an input/output interface of the identified member for instructing the identified member to substitute for the member requiring support to complete the at least one identified service event.

* * * * *